US008931331B2

(12) United States Patent
Ludowise et al.

(10) Patent No.: US 8,931,331 B2
(45) Date of Patent: Jan. 13, 2015

(54) SYSTEMS AND METHODS FOR VOLUMETRIC METERING ON A SAMPLE PROCESSING DEVICE

(75) Inventors: Peter D. Ludowise, Cottage Grove, MN (US); David A. Whitman, St. Paul, MN (US); Jeffrey D. Smith, Marine on St. Croix, MN (US)

(73) Assignee: 3M Innovative Properties Company, St. Paul, MN (US)

(*) Notice: Subject to any disclaimer, the term of this patent is extended or adjusted under 35 U.S.C. 154(b) by 286 days.

(21) Appl. No.: 13/474,873

(22) Filed: May 18, 2012

(65) Prior Publication Data

US 2012/0291538 A1 Nov. 22, 2012

Related U.S. Application Data

(60) Provisional application No. 61/487,672, filed on May 18, 2011, provisional application No. 61/490,014, filed on May 25, 2011.

(51) Int. Cl.
*G01F 11/22* (2006.01)
*B01L 3/00* (2006.01)

(52) U.S. Cl.
CPC ........... *B01L 3/5027* (2013.01); *B01L 3/50273* (2013.01); *B01L 3/502738* (2013.01); *B01L 3/5025* (2013.01); *B01L 2200/0605* (2013.01); *B01L 2300/0806* (2013.01); *B01L 2400/0406* (2013.01); *B01L 2400/0409* (2013.01); *B01L 2400/0688* (2013.01)
USPC .......................................................... 73/64.56

(58) Field of Classification Search
CPC ............................ G01F 11/22; G01N 35/1016
See application file for complete search history.

(56) References Cited

U.S. PATENT DOCUMENTS 3,555,284 A 1/1971 Anderson
3,595,386 A 7/1971 Hradel (Continued)

FOREIGN PATENT DOCUMENTS

CA 2130013 3/1999
DE 3712624 11/1988

(Continued)

OTHER PUBLICATIONS

International Search Report PCT/US2012/038478, 3 pages, Aug. 6, 2012.

(Continued)

*Primary Examiner* — Paul West
(74) *Attorney, Agent, or Firm* — Nicole J. Einerson

(57) ABSTRACT

A system and method for volumetric metering on a sample processing device. The system can include a metering reservoir, and a waste reservoir positioned in fluid communication with a first end of the metering reservoir to catch excess liquid from the metering reservoir that exceeds a selected volume. The system can further include a capillary valve in fluid communication with the second end of the metering reservoir to inhibit liquid from exiting the metering reservoir until desired. The method can include metering the liquid by rotating the sample processing device to exert a first force on the liquid that is insufficient to move the liquid into the capillary valve, and rotating the sample processing device to exert a second force on the liquid that is greater than the first force to move the metered volume of the liquid to the process chamber via the capillary valve.

24 Claims, 8 Drawing Sheets

(56) References Cited

U.S. PATENT DOCUMENTS

| | | | |
|---|---|---|---|
| 3,713,124 | A | 1/1973 | Durland et al. |
| 3,795,451 | A | 3/1974 | Mailen |
| 3,798,459 | A | 3/1974 | Anderson et al. |
| 3,856,470 | A | 12/1974 | Cullis et al. |
| 3,873,217 | A | 3/1975 | Anderson et al. |
| 3,912,799 | A | 10/1975 | Chisholm |
| 3,964,867 | A | 6/1976 | Berry |
| 4,030,834 | A | 6/1977 | Bauer et al. |
| 4,046,511 | A | 9/1977 | Stabile |
| 4,111,304 | A | 9/1978 | Lucas |
| 4,123,173 | A | 10/1978 | Bullock et al. |
| 4,244,916 | A | 1/1981 | Guigan |
| 4,252,538 | A | 2/1981 | Barr |
| 4,256,696 | A | 3/1981 | Soodak |
| 4,284,602 | A | 8/1981 | Kelton |
| 4,298,570 | A | 11/1981 | Lillig et al. |
| 4,384,193 | A | 5/1983 | Kledzik et al. |
| 4,390,499 | A | 6/1983 | Curtis et al. |
| 4,396,579 | A | 8/1983 | Schroeder et al. |
| D271,993 | S | 12/1983 | Swartz |
| 4,456,581 | A | 6/1984 | Edelmann et al. |
| D274,553 | S | 7/1984 | Perry |
| 4,476,733 | A | 10/1984 | Chlosta et al. |
| 4,488,810 | A | 12/1984 | Hatanaka et al. |
| 4,498,896 | A | 2/1985 | Leis |
| D277,891 | S | 3/1985 | Uffenheimer et al. |
| 4,554,436 | A | 11/1985 | Chlosta et al. |
| 4,580,896 | A | 4/1986 | Brickus et al. |
| 4,632,908 | A | 12/1986 | Schultz |
| D288,124 | S | 2/1987 | Brickus et al. |
| 4,673,657 | A | 6/1987 | Christian |
| 4,695,430 | A | 9/1987 | Coville et al. |
| 4,766,078 | A | 8/1988 | Gang |
| 4,814,279 | A | 3/1989 | Sugaya |
| 4,839,296 | A | 6/1989 | Kennedy et al. |
| 4,906,432 | A | 3/1990 | Geiselman |
| 4,933,146 | A | 6/1990 | Meyer et al. |
| 4,981,801 | A | 1/1991 | Suzuki et al. |
| 4,990,075 | A | 2/1991 | Wogoman |
| D321,057 | S | 10/1991 | Holen |
| D329,024 | S | 9/1992 | Marks |
| 5,149,505 | A | 9/1992 | English et al. |
| 5,160,702 | A | 11/1992 | Kopf-Sill |
| 5,182,083 | A | 1/1993 | Barker et al. |
| 5,207,987 | A | 5/1993 | Kureshy et al. |
| 5,219,526 | A | 6/1993 | Long |
| 5,229,297 | A | 7/1993 | Schnipelsky et al. |
| 5,254,479 | A | 10/1993 | Chemelli |
| 5,256,376 | A | 10/1993 | Callan |
| 5,258,163 | A | 11/1993 | Krause et al. |
| 5,264,184 | A | 11/1993 | Aysta et al. |
| 5,278,377 | A | 1/1994 | Tsai |
| 5,281,516 | A | 1/1994 | Stapleton et al. |
| 5,288,463 | A | 2/1994 | Chemelli |
| 5,310,523 | A | 5/1994 | Smethers et al. |
| 5,320,808 | A | 6/1994 | Holen |
| 5,336,467 | A | 8/1994 | Heidt et al. |
| 5,411,065 | A | 5/1995 | Meador et al. |
| 5,415,839 | A | 5/1995 | Zaun et al. |
| 5,422,271 | A | 6/1995 | Chen et al. |
| 5,438,128 | A | 8/1995 | Nieuwkerk et al. |
| 5,439,649 | A | 8/1995 | Tseung et al. |
| 5,460,780 | A | 10/1995 | Devaney, Jr. et al. |
| 5,464,541 | A | 11/1995 | Aysta et al. |
| 5,496,518 | A | 3/1996 | Arai et al. |
| 5,496,520 | A | 3/1996 | Kelton et al. |
| 5,525,514 | A | 6/1996 | Jacobs et al. |
| 5,571,410 | A | 11/1996 | Swedberg et al. |
| 5,578,270 | A | 11/1996 | Reichler et al. |
| 5,587,128 | A | 12/1996 | Wilding et al. |
| 5,593,838 | A | 1/1997 | Zanzucchi et al. |
| 5,599,501 | A | 2/1997 | Carey et al. |
| 5,601,141 | A | 2/1997 | Gordon et al. |
| 5,604,130 | A | 2/1997 | Warner et al. |
| 5,616,301 | A | 4/1997 | Moser et al. |
| 5,637,469 | A | 6/1997 | Wilding et al. |
| 5,639,428 | A | 6/1997 | Cottingham |
| 5,653,940 | A | 8/1997 | Carey |
| 5,693,233 | A | 12/1997 | Schembri |
| 5,700,695 | A | 12/1997 | Yassinzadeh |
| RE35,716 | E | 1/1998 | Stapleton et al. |
| 5,720,923 | A | 2/1998 | Haff et al. |
| 5,721,123 | A | 2/1998 | Hayes et al. |
| 5,726,026 | A | 3/1998 | Wilding et al. |
| 5,795,547 | A | 8/1998 | Moser et al. |
| 5,800,785 | A | 9/1998 | Bochner |
| 5,804,141 | A | 9/1998 | Chianese |
| 5,811,296 | A | 9/1998 | Chemelli et al. |
| 5,819,842 | A | 10/1998 | Potter et al. |
| 5,833,923 | A | 11/1998 | McClintock et al. |
| 5,856,194 | A | 1/1999 | Arnquist et al. |
| 5,863,502 | A | 1/1999 | Southgate et al. |
| 5,863,801 | A | 1/1999 | Southgate et al. |
| 5,869,002 | A | 2/1999 | Limon et al. |
| 5,876,675 | A | 3/1999 | Kennedy |
| 5,886,863 | A | 3/1999 | Nagasaki et al. |
| 5,922,617 | A | 7/1999 | Wang et al. |
| 5,948,227 | A | 9/1999 | Dubrow |
| 5,976,468 | A | 11/1999 | Godec et al. |
| 5,997,818 | A | 12/1999 | Hacker et al. |
| 6,001,643 | A | 12/1999 | Spaulding |
| 6,007,690 | A | 12/1999 | Nelson et al. |
| 6,013,513 | A | 1/2000 | Reber et al. |
| 6,015,674 | A | 1/2000 | Woudenberg |
| 6,030,581 | A | 2/2000 | Virtanen |
| 6,048,457 | A | 4/2000 | Kopaciewicz et al. |
| 6,063,589 | A | 5/2000 | Kellogg et al. |
| 6,068,751 | A | 5/2000 | Neukermans |
| 6,074,827 | A | 6/2000 | Nelson et al. |
| 6,093,370 | A | 7/2000 | Yasuda et al. |
| 6,103,199 | A | 8/2000 | Bjornson et al. |
| 6,143,247 | A | 11/2000 | Sheppard, Jr. et al. |
| 6,143,248 | A | 11/2000 | Kellogg et al. |
| 6,153,012 | A | 11/2000 | Rupp et al. |
| 6,168,759 | B1 | 1/2001 | Green et al. |
| 6,168,948 | B1 | 1/2001 | Anderson et al. |
| 6,183,693 | B1 | 2/2001 | Bogen et al. |
| 6,184,029 | B1 | 2/2001 | Wilding et al. |
| 6,190,617 | B1 | 2/2001 | Clark et al. |
| 6,197,595 | B1 | 3/2001 | Anderson et al. |
| 6,200,474 | B1 | 3/2001 | Kopaciewicz et al. |
| D441,873 | S | 5/2001 | Köhler |
| 6,235,531 | B1 | 5/2001 | Kopf-Sill |
| 6,265,168 | B1 | 7/2001 | Gjerde et al. |
| 6,284,113 | B1 | 9/2001 | Bjornson et al. |
| 6,296,809 | B1 | 10/2001 | Richards et al. |
| 6,302,134 | B1 | 10/2001 | Kellogg et al. |
| 6,306,273 | B1 | 10/2001 | Wainright et al. |
| 6,319,469 | B1 | 11/2001 | Mian et al. |
| 6,344,326 | B1 | 2/2002 | Nelson et al. |
| 6,375,898 | B1 | 4/2002 | Ulrich et al. |
| 6,391,264 | B2 | 5/2002 | Hammer et al. |
| 6,399,025 | B1 | 6/2002 | Chow |
| 6,413,782 | B1 | 7/2002 | Parce et al. |
| 6,414,136 | B1 | 7/2002 | Spicer |
| 6,432,365 | B1 | 8/2002 | Levin et al. |
| 6,440,725 | B1 | 8/2002 | Pourahmadi et al. |
| 6,450,047 | B2 | 9/2002 | Swedberg et al. |
| 6,461,287 | B1 | 10/2002 | Glater |
| 6,465,225 | B1 | 10/2002 | Fuhr et al. |
| 6,467,275 | B1 | 10/2002 | Ghoshal |
| 6,479,300 | B1 | 11/2002 | Jiang et al. |
| 6,527,432 | B2 | 3/2003 | Kellogg et al. |
| 6,532,997 | B1 | 3/2003 | Bedingham et al. |
| 6,548,788 | B2 | 4/2003 | Kellogg |
| 6,558,947 | B1 | 5/2003 | Lund et al. |
| 6,565,808 | B2 | 5/2003 | Hudak et al. |
| 6,566,637 | B1 | 5/2003 | Revesz et al. |
| 6,572,830 | B1 | 6/2003 | Burdon et al. |
| 6,582,662 | B1 | 6/2003 | Kellogg et al. |
| 6,593,143 | B1 | 7/2003 | Gordon |
| 6,617,136 | B2 | 9/2003 | Parthasarathy et al. |
| 6,627,159 | B1 | 9/2003 | Bedingham et al. |
| 6,632,399 | B1 | 10/2003 | Kellogg et al. |

(56) References Cited

U.S. PATENT DOCUMENTS

| | | | |
|---|---|---|---|
| 6,645,758 | B1 | 11/2003 | Schnipelsky et al. |
| 6,648,853 | B1 | 11/2003 | McEntee |
| 6,660,147 | B1 | 12/2003 | Woudenberg et al. |
| 6,664,104 | B2 | 12/2003 | Pourahmadi et al. |
| 6,692,596 | B2 | 2/2004 | Moll et al. |
| 6,706,519 | B1 | 3/2004 | Kellogg et al. |
| 6,709,869 | B2 | 3/2004 | Mian |
| 6,720,187 | B2 | 4/2004 | Bedingham et al. |
| 6,723,236 | B2 | 4/2004 | Fisk et al. |
| 6,730,516 | B2 | 5/2004 | Jedrzejewski et al. |
| 6,734,401 | B2 | 5/2004 | Bedingham et al. |
| 6,752,961 | B2 | 6/2004 | Kopf-Sill |
| 6,780,818 | B2 | 8/2004 | Gundel et al. |
| 6,814,935 | B2 | 11/2004 | Harms et al. |
| 6,824,738 | B1 | 11/2004 | Neeper et al. |
| 6,889,468 | B2 | 5/2005 | Bedingham et al. |
| 6,972,113 | B1 | 12/2005 | Ramshaw |
| 6,987,253 | B2 | 1/2006 | Bedingham et al. |
| 7,026,168 | B2 | 4/2006 | Bedingham et al. |
| 7,164,107 | B2 | 1/2007 | Bedingham et al. |
| 7,192,560 | B2 | 3/2007 | Parthasarathy et al. |
| 7,273,591 | B2 | 9/2007 | Sellers et al. |
| D557,425 | S | 12/2007 | Nakamura et al. |
| D559,993 | S | 1/2008 | Nagakubo et al. |
| D559,994 | S | 1/2008 | Nagakubo et al. |
| D560,284 | S | 1/2008 | Nagakubo et al. |
| 7,322,254 | B2 | 1/2008 | Bedingham et al. |
| 7,323,660 | B2 | 1/2008 | Bedingham et al. |
| 7,332,326 | B1 | 2/2008 | Kellogg et al. |
| D564,667 | S | 3/2008 | Bedingham et al. |
| 7,396,508 | B1 | 7/2008 | Richards et al. |
| 7,435,933 | B2 | 10/2008 | Bedingham et al. |
| 7,445,752 | B2 | 11/2008 | Harms |
| 7,507,575 | B2 | 3/2009 | Bedingham |
| 7,527,763 | B2 | 5/2009 | Bedingham |
| 7,569,186 | B2 | 8/2009 | Bedingham et al. |
| D600,722 | S | 9/2009 | Yabe et al. |
| 7,595,200 | B2 | 9/2009 | Bedingham |
| D605,206 | S | 12/2009 | Yabe et al. |
| 7,628,954 | B2 | 12/2009 | Gomm et al. |
| 7,678,334 | B2 | 3/2010 | Bedingham |
| 7,709,249 | B2 | 5/2010 | Bedingham |
| 7,754,474 | B2 | 7/2010 | Aysta et al. |
| 7,763,210 | B2 | 7/2010 | Bedingham et al. |
| 7,767,937 | B2 | 8/2010 | Bedingham et al. |
| 7,837,947 | B2 | 11/2010 | Bedingham |
| 7,855,083 | B2 | 12/2010 | Bedingham |
| 7,867,767 | B2 | 1/2011 | Bedingham |
| 7,871,827 | B2 | 1/2011 | Parthasarathy |
| D638,550 | S | 5/2011 | Bedingham |
| D638,951 | S | 5/2011 | Bedingham |
| 2001/0045000 | A1 | 11/2001 | Gundel et al. |
| 2002/0001848 | A1 | 1/2002 | Bedingham |
| 2002/0047003 | A1 | 4/2002 | Bedingham et al. |
| 2002/0048533 | A1 | 4/2002 | Harms et al. |
| 2002/0064885 | A1 | 5/2002 | Bedingham et al. |
| 2002/0076354 | A1 | 6/2002 | Cohen |
| 2002/0097632 | A1 | 7/2002 | Kellogg |
| 2003/0013203 | A1 | 1/2003 | Jedrzejewski et al. |
| 2003/0017567 | A1 | 1/2003 | Parthasarathy et al. |
| 2003/0044322 | A1 | 3/2003 | Andersson et al. |
| 2003/0053934 | A1 | 3/2003 | Andersson et al. |
| 2003/0118804 | A1 | 6/2003 | Bedingham et al. |
| 2003/0120062 | A1 | 6/2003 | Parthasarathy et al. |
| 2003/0124506 | A1 | 7/2003 | Bedingham et al. |
| 2003/0138779 | A1 | 7/2003 | Parthasarathy et al. |
| 2003/0152491 | A1 | 8/2003 | Kellogg et al. |
| 2003/0152994 | A1 | 8/2003 | Woudenberg et al. |
| 2003/0155034 | A1 | 8/2003 | De Beukeleer et al. |
| 2003/0228706 | A1 | 12/2003 | Ramstad et al. |
| 2003/0231878 | A1 | 12/2003 | Shigeura |
| 2004/0007275 | A1 | 1/2004 | Hui Liu |
| 2004/0016702 | A1 | 1/2004 | Hennessy et al. |
| 2004/0016898 | A1 | 1/2004 | Cox et al. |
| 2004/0018116 | A1 | 1/2004 | Desmond et al. |
| 2004/0018117 | A1 | 1/2004 | Desmond et al. |
| 2004/0023371 | A1 | 2/2004 | Fawcett |
| 2004/0053290 | A1 | 3/2004 | Terbrueggen |
| 2004/0121471 | A1 | 6/2004 | Dufresne et al. |
| 2004/0175296 | A1* | 9/2004 | Opalsky et al. ............ 422/82.01 |
| 2004/0179974 | A1 | 9/2004 | Bedingham et al. |
| 2004/0191125 | A1 | 9/2004 | Kellogg |
| 2004/0209258 | A1 | 10/2004 | Parthasarathy et al. |
| 2005/0028587 | A1 | 2/2005 | Baer |
| 2005/0036911 | A1 | 2/2005 | Sellers et al. |
| 2005/0041525 | A1 | 2/2005 | Pugia et al. |
| 2005/0109396 | A1 | 5/2005 | Zucchelli et al. |
| 2005/0126312 | A1 | 6/2005 | Bedingham |
| 2005/0129583 | A1 | 6/2005 | Bedingham |
| 2005/0130177 | A1 | 6/2005 | Bedingham et al. |
| 2005/0142563 | A1 | 6/2005 | Haddad et al. |
| 2005/0142570 | A1 | 6/2005 | Parthasarathy et al. |
| 2005/0142571 | A1 | 6/2005 | Parthasarathy et al. |
| 2005/0142663 | A1 | 6/2005 | Parthasarathy et al. |
| 2005/0180890 | A1 | 8/2005 | Bedingham et al. |
| 2005/0224337 | A1 | 10/2005 | Iwasaki et al. |
| 2005/0277195 | A1 | 12/2005 | Holmquist et al. |
| 2005/0282290 | A1 | 12/2005 | Fujimoto |
| 2006/0013732 | A1 | 1/2006 | Parthasarathy et al. |
| 2006/0040273 | A1 | 2/2006 | Chaiken et al. |
| 2006/0076346 | A1 | 4/2006 | Bedingham et al. |
| 2006/0228811 | A1 | 10/2006 | Bedingham |
| 2007/0007270 | A1 | 1/2007 | Bedingham et al. |
| 2007/0009382 | A1 | 1/2007 | Bedingham |
| 2007/0009383 | A1 | 1/2007 | Bedingham |
| 2007/0009391 | A1 | 1/2007 | Bedingham et al. |
| 2007/0010007 | A1 | 1/2007 | Aysta et al. |
| 2007/0132723 | A1 | 6/2007 | Lurz et al. |
| 2007/0142780 | A1 | 6/2007 | Van Lue |
| 2007/0160504 | A1 | 7/2007 | Parthasarathy |
| 2008/0050276 | A1 | 2/2008 | Bedingham et al. |
| 2008/0056949 | A1 | 3/2008 | Lee |
| 2008/0058991 | A1 | 3/2008 | Lee |
| 2008/0135462 | A1 | 6/2008 | Park |
| 2008/0149190 | A1 | 6/2008 | Bedingham |
| 2008/0152546 | A1 | 6/2008 | Bedingham |
| 2008/0156079 | A1 | 7/2008 | Momose |
| 2008/0314895 | A1 | 12/2008 | Bedingham |
| 2009/0068062 | A1 | 3/2009 | Jafari et al. |
| 2009/0111675 | A1 | 4/2009 | Yokogawa |
| 2009/0143250 | A1 | 6/2009 | Lee |
| 2009/0263280 | A1 | 10/2009 | Bedingham et al. |
| 2010/0050751 | A1 | 3/2010 | Lee |
| 2010/0129878 | A1 | 5/2010 | Parthasarathy |
| 2010/0167304 | A1 | 7/2010 | Bedingham |
| 2010/0175994 | A1 | 7/2010 | Lee |
| 2010/0240124 | A1 | 9/2010 | Aysta |
| 2010/0266456 | A1 | 10/2010 | Bedingham |
| 2011/0027904 | A1 | 2/2011 | Bedingham |
| 2011/0053785 | A1 | 3/2011 | Bedingham |
| 2011/0117607 | A1 | 5/2011 | Bedingham |
| 2011/0117656 | A1 | 5/2011 | Robole |
| 2011/0124132 | A1 | 5/2011 | Kim |

FOREIGN PATENT DOCUMENTS

| | | |
|---|---|---|
| EP | 0160901 | 11/1985 |
| EP | 0169306 | 5/1990 |
| EP | 0402994 | 11/1994 |
| EP | 0693560 | 1/1996 |
| EP | 0807468 | 11/1997 |
| EP | 0810030 | 12/1997 |
| EP | 0965388 | 12/1999 |
| EP | 1010979 | 6/2000 |
| EP | 1681553 | 7/2006 |
| EP | 1935492 | 6/2008 |
| JP | 60-57259 | 4/1985 |
| JP | 60-238745 | 11/1985 |
| JP | 63-019558 | 1/1988 |
| JP | 64-041861 | 2/1989 |
| JP | 2292720 | 12/1990 |
| JP | 3-048770 | 3/1991 |
| JP | 5-093729 | 4/1993 |
| JP | 5-507878 | 11/1993 |

(56) References Cited

FOREIGN PATENT DOCUMENTS

| | | |
|---|---|---|
| JP | 6-050981 | 2/1994 |
| JP | 9-72912 | 3/1997 |
| JP | 9-189704 | 7/1997 |
| JP | 10-019884 | 1/1998 |
| JP | 2003-504637 | 2/2003 |
| JP | 2004-525339 | 8/2004 |
| JP | 2005-514014 | 5/2005 |
| JP | 2005-274241 | 10/2005 |
| JP | 2009-216395 | 9/2009 |
| WO | 91/19567 | 12/1991 |
| WO | 94/26414 | 11/1994 |
| WO | 94/29400 | 12/1994 |
| WO | 95/18676 | 7/1995 |
| WO | 95/19781 | 7/1995 |
| WO | 95/33986 | 12/1995 |
| WO | 96/15576 | 5/1996 |
| WO | 96/41864 | 12/1996 |
| WO | 96/41865 | 12/1996 |
| WO | 97/21090 | 6/1997 |
| WO | 97/46707 | 12/1997 |
| WO | 98/04909 | 2/1998 |
| WO | 98/07019 | 2/1998 |
| WO | 98/38510 | 9/1998 |
| WO | 98/49340 | 11/1998 |
| WO | 98/50147 | 11/1998 |
| WO | 98/53311 | 11/1998 |
| WO | 99/09394 | 2/1999 |
| WO | 99/15876 | 4/1999 |
| WO | 99/15888 | 4/1999 |
| WO | 99/40174 | 8/1999 |
| WO | 99/44740 | 9/1999 |
| WO | 99/46591 | 9/1999 |
| WO | 99/55827 | 11/1999 |
| WO | 99/58245 | 11/1999 |
| WO | 99/67639 | 12/1999 |
| WO | 00/05582 | 2/2000 |
| WO | 00/35583 | 6/2000 |
| WO | 00/40750 | 7/2000 |
| WO | 00/50172 | 8/2000 |
| WO | 00/50642 | 8/2000 |
| WO | 00/62051 | 10/2000 |
| WO | 00/69560 | 11/2000 |
| WO | 00/78455 | 12/2000 |
| WO | 00/79285 | 12/2000 |
| WO | 01/06228 | 1/2001 |
| WO | 01/07892 | 2/2001 |
| WO | 01/12327 | 2/2001 |
| WO | 01/25490 | 4/2001 |
| WO | 01/25491 | 4/2001 |
| WO | 01/30995 | 5/2001 |
| WO | 01/38865 | 5/2001 |
| WO | 02/00347 | 1/2002 |
| WO | 03/054509 | 7/2003 |
| WO | 03/054510 | 7/2003 |
| WO | 03/058224 | 7/2003 |
| WO | 03/058253 | 7/2003 |
| WO | 03/093836 | 11/2003 |
| WO | 03/104783 | 12/2003 |
| WO | 2004/010760 | 2/2004 |
| WO | 2004/011142 | 2/2004 |
| WO | 2004/011143 | 2/2004 |
| WO | 2004/011147 | 2/2004 |
| WO | 2004/011148 | 2/2004 |
| WO | 2004/011149 | 2/2004 |
| WO | 2004/011365 | 2/2004 |
| WO | 2004/011592 | 2/2004 |
| WO | 2004/011681 | 2/2004 |
| WO | 2004/094672 | 11/2004 |
| WO | 2005/005045 | 1/2005 |
| WO | 2005/016532 | 2/2005 |
| WO | 2005/028096 | 3/2005 |
| WO | 2005/079986 | 9/2005 |
| WO | 2007/005810 | 1/2007 |
| WO | 2007/005853 | 1/2007 |
| WO | 2007/057788 | 5/2007 |
| WO | 2008/080046 | 7/2008 |
| WO | 2008/134470 | 11/2008 |
| WO | 2008/157689 | 12/2008 |
| WO | 2009/018225 | 2/2009 |
| WO | 2009/085884 | 7/2009 |

OTHER PUBLICATIONS

Leu et al., "Pressure Barrier of Capillary Stop Valves in Micro Sample Separators", Sensors and Actuators A 115 (2004) 508-515.

U.S. Appl. No. 60/237,151, filed Oct. 2, 2000.

Chiou et al., "A Closed-Cycle Capillary Polymerase Chain Reaction Machine", Analytical Chemistry, vol. 73, No. 9, May 1, 2001, 2018-2021.

* cited by examiner

SYSTEMS AND METHODS FOR VOLUMETRIC METERING ON A SAMPLE PROCESSING DEVICE

RELATED APPLICATIONS

Priority is hereby claimed to U.S. Provisional Patent Application No. 61/487,672, filed May 18, 2011, and U.S. Provisional Patent Application No. 61/490,014, filed May 25, 2011, each of which is incorporated herein by reference in its entirety.

FIELD

The present disclosure generally relates to volumetric metering of fluid samples on a microfluidic sample processing device.

BACKGROUND

Optical disk systems can be used to perform various biological, chemical or bio-chemical assays, such as genetic-based assays or immunoassays. In such systems, a rotatable disk with multiple chambers can be used as a medium for storing and processing fluid specimens, such as blood, plasma, serum, urine or other fluid. The multiple chambers on one disk can allow for simultaneous processing of multiple portions of one sample, or of multiple samples, thereby reducing the time and cost to process multiple samples, or portions of one sample.

SUMMARY

Some assays that may be performed on sample processing devices may require a precise amount of a sample and/or a reagent medium, or a precise ratio of the sample to the reagent medium. The present disclosure is generally directed to on-board metering structures on a sample processing device that can be used to deliver a selected volume of a sample and/or a reagent medium from an input chamber to a process, or detection, chamber. By delivering the selected volumes to the process chamber, the desired ratios of sample to reagent can be achieved. In addition, by performing the metering "on-board," a user need not precisely measure and deliver a specific amount of material to the sample processing device. Rather, the user can deliver a nonspecific amount of sample and/or reagent to the sample processing device, and the sample processing device itself can meter a desired amount of the materials to a downstream process or detection chamber.

Some aspects of the present disclosure provide a metering structure on a sample processing device. The sample processing device can be configured to be rotated about an axis of rotation. The metering structure can include a metering reservoir configured to hold a selected volume of liquid. The metering reservoir can include a first end and a second end positioned radially outwardly of the first end, relative to the axis of rotation. The metering structure can further include a waste reservoir positioned in fluid communication with the first end of the metering reservoir and configured to catch excess liquid from the metering reservoir when the selected volume of the metering reservoir is exceeded, wherein at least a portion of the waste reservoir is positioned radially outwardly of the metering reservoir, relative to the axis of rotation. The metering structure can further include a capillary valve in fluid communication with the second end of the metering reservoir. The capillary valve can be positioned radially outwardly of at least a portion of the metering reservoir, relative to the axis of rotation, and can be configured to inhibit liquid from exiting the metering reservoir until desired. The metering structure can be unvented, such that the metering structure is not in fluid communication with ambience.

Some aspects of the present disclosure provide a processing array on a sample processing device. The sample processing device can be configured to be rotated about an axis of rotation. The processing array can include an input chamber. The input chamber can include a metering reservoir configured to hold a selected volume of liquid, the metering reservoir including a first end and a second end positioned radially outwardly of the first end, relative to the axis of rotation; and a waste reservoir positioned in fluid communication with the first end of the metering reservoir. The waste reservoir can be configured to catch excess liquid from the metering reservoir when the selected volume of the metering reservoir is exceeded, wherein at least a portion of the waste reservoir is positioned radially outwardly of the metering reservoir, relative to the axis of rotation. The input chamber can further include a baffle positioned to at least partially define the selected volume of the metering reservoir and to separate the metering reservoir and the waste reservoir. The processing array can further include a capillary valve positioned in fluid communication with the second end of the metering reservoir of the input chamber. The capillary valve can be positioned radially outwardly of at least a portion of the metering reservoir, relative to the axis of rotation, and can be configured to inhibit liquid from exiting the metering reservoir until desired. The processing array can further include a process chamber positioned to be in fluid communication with the input chamber and configured to receive the selected volume of fluid from the metering reservoir via the capillary valve.

Some aspects of the present disclosure provide a method for volumetric metering on a sample processing device. The method can include providing a sample processing device configured to be rotated about an axis of rotation and comprising a processing array. The processing array can include a metering reservoir configured to hold a selected volume of liquid, the metering reservoir including a first end and a second end positioned radially outwardly of the first end, relative to the axis of rotation; and a waste reservoir positioned in fluid communication with the first end of the metering reservoir. The waste reservoir can be configured to catch excess liquid from the metering reservoir when the selected volume of the metering reservoir is exceeded, wherein at least a portion of the waste reservoir is positioned radially outwardly of the metering reservoir, relative to the axis of rotation. The processing array can further include a capillary valve in fluid communication with the second end of the metering reservoir. The capillary valve can be positioned radially outwardly of at least a portion of the metering reservoir, relative to the axis of rotation, and can be configured to inhibit liquid from exiting the metering reservoir until desired. The processing array can further include a process chamber positioned to be in fluid communication with the metering reservoir via the capillary valve. The method can further include positioning a liquid in the processing array of the sample processing device. The method can further include metering the liquid by rotating the sample processing device about the axis of rotation to exert a first force on the liquid such that the selected volume of the liquid is contained in the metering reservoir and any additional volume of the liquid is moved into the waste reservoir but not the capillary valve. The method can further include, after the liquid is metered, moving the selected volume of the liquid to the process chamber via the capillary valve by rotating the sample processing device about the axis of rotation to exert a second force on the liquid that is greater than the first force.

Other features and aspects of the present disclosure will become apparent by consideration of the detailed description and accompanying drawings.

DETAILED DESCRIPTION

Figure 1:
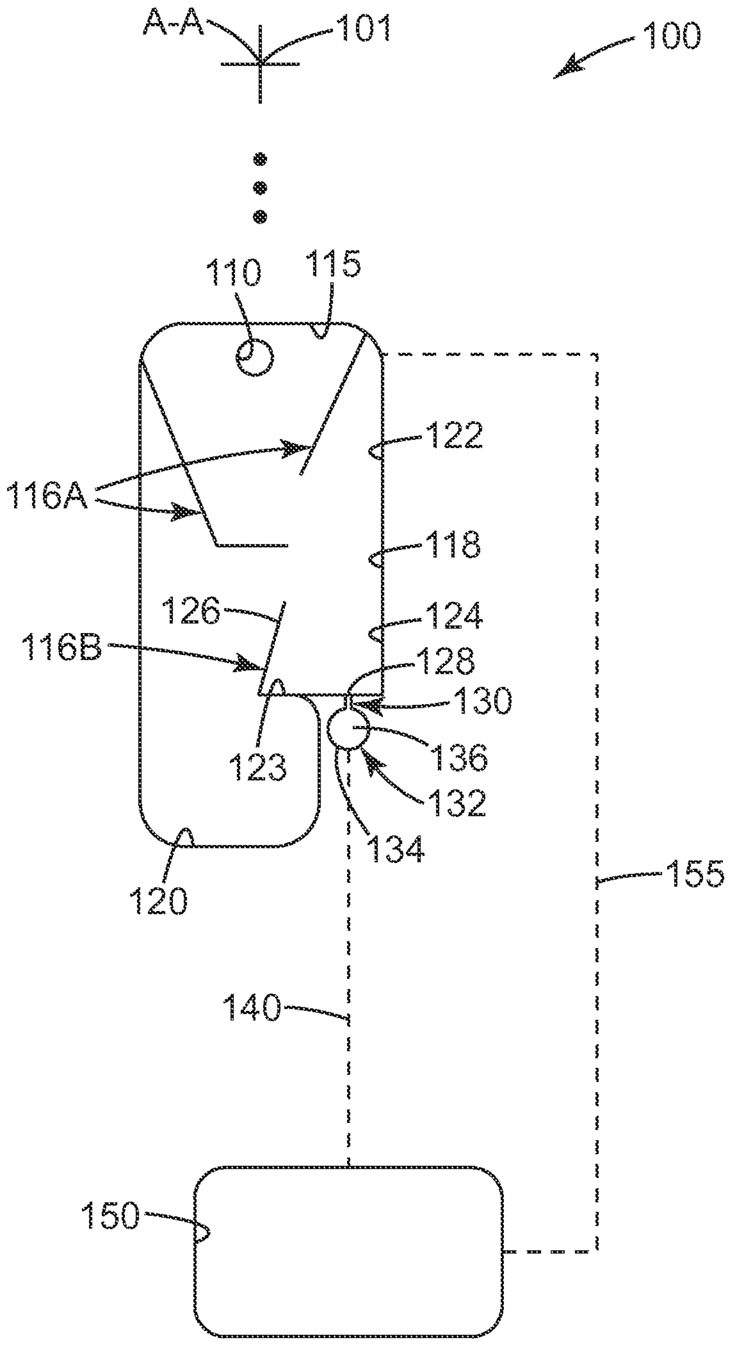
FIG. 1 is a schematic diagram of a sample processing array according to one embodiment of the present disclosure.

Before any embodiments of the present disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “connected” and “coupled” and variations thereof are used broadly and encompass both direct and indirect connections, and couplings. It is to be understood that other embodiments may be utilized, and structural or logical changes may be made without departing from the scope of the present disclosure. Furthermore, terms such as “top,” “bottom,” and the like are only used to describe elements as they relate to one another, but are in no way meant to recite specific orientations of the apparatus, to indicate or imply necessary or required orientations of the apparatus, or to specify how the invention described herein will be used, mounted, displayed, or positioned in use.

The present disclosure generally relates to volumetric metering structures and methods on a microfluidic sample processing device. Particularly, the present disclosure relates to “on-board” metering structures that can be used to deliver a selected volume of materials from an input chamber to a downstream process, or detection, chamber. The on-board metering structures allow a user to load a nonspecific volume of materials (e.g., a sample and/or reagent medium) onto the sample processing device, while still delivering the selected volume(s) to the downstream chamber(s).

In some embodiments of the present disclosure (e.g., as described below with respect to the sample processing device 200 of FIGS. 2-8), a sample of interest (e.g., a raw sample, such as a raw patient sample, a raw environmental sample, etc.) can be loaded separately from various reagents or media that will be used in processing the sample for a particularly assay. In some embodiments, such reagents can be added as one single cocktail or “master mix” reagent that includes all of the reagents necessary for an assay of interest. The sample can be suspended or prepared in a diluent, and the diluent can include or be the same as the reagent for the assay of interest. The sample and diluent will be referred to herein as merely the “sample” for simplicity, and a sample combined with a diluent is generally still considered a raw sample, as no substantial processing, measuring, lysing, or the like, has yet been performed.

The sample can include a solid, a liquid, a semi-solid, a gelatinous material, and combinations thereof, such as a suspension of particles in a liquid. In some embodiments, the sample can be an aqueous liquid.

The phrase “raw sample” is generally used to refer to a sample that has not undergone any processing or manipulation prior to being loaded onto the sample processing device, besides merely being diluted or suspended in a diluents. That is, a raw sample may include cells, debris, inhibitors, etc., and has not been previously lysed, washed, buffered, or the like, prior to being loaded onto the sample processing device. A raw sample can also include a sample that is obtained directly from a source and transferred from one container to another without manipulation. The raw sample can also include a patient specimen in a variety of media, including, but not limited to, transport medium, cerebral spinal fluid, whole blood, plasma, serum, etc. For example, a nasal swab sample containing viral particles obtained from a patient may be transported and/or stored in a transport buffer or medium (which can contain anti-microbials) used to suspend and stabilize the particles before processing. A portion of the transport medium with the suspended particles can be considered the “sample.” All of the “samples” used with the devices and systems of the present disclosure and discussed herein can be raw samples.

It should be understood that while sample processing devices of the present disclosure are illustrated herein as being circular in shape and are sometimes referred to as “disks,” a variety of other shapes and configurations of the sample processing devices of the present disclosure are possible, and the present disclosure is not limited to circular sample processing devices. As a result, the term “disk” is often used herein in place of “sample processing device” for brevity and simplicity, but this term is not intended to be limiting.

The sample processing devices of the present disclosure can be used in methods that involve thermal processing, e.g., sensitive chemical processes such as polymerase chain reaction (PCR) amplification, transcription-mediated amplification (TMA), nucleic acid sequence-based amplification (NASBA), ligase chain reaction (LCR), self-sustaining sequence replication, enzyme kinetic studies, homogeneous ligand binding assays, immunoassays, such as enzyme linked immunosorbent assay (ELISA), and more complex biochemical or other processes that require precise thermal control and/or rapid thermal variations.

Some examples of suitable construction techniques or materials that may be adapted for use in connection with the present invention may be described in, e.g., commonly-assigned U.S. Pat. Nos. 6,734,401, 6,987,253, 7,435,933, 7,164,107 and 7,435,933, entitled ENHANCED SAMPLE PROCESSING DEVICES SYSTEMS AND METHODS (Bedingham et al.); U.S. Pat. No. 6,720,187, entitled MULTI-FORMAT SAMPLE PROCESSING DEVICES (Bedingham et al.); U.S. Patent Publication No. 2004/0179974, entitled MULTI-FORMAT SAMPLE PROCESSING DEVICES AND SYSTEMS (Bedingham et al.); U.S. Pat. No. 6,889,468, entitled MODULAR SYSTEMS AND METHODS FOR USING SAMPLE PROCESSING DEVICES (Bedingham et al.); U.S. Pat. No. 7,569,186, entitled SYSTEMS FOR USING SAMPLE PROCESSING DEVICES (Bedingham et al.); U.S. Patent Publication No. 2009/0263280, entitled THERMAL STRUCTURE FOR SAMPLE PROCESSING SYSTEM (Bedingham et al.); U.S. Pat. No. 7,322,254 and U.S. Patent Publication No. 2010/0167304, entitled VARIABLE VALVE APPARATUS AND METHOD (Bedingham et al.); U.S. Pat. No. 7,837,947 and U.S. Patent Publication No. 2011/0027904, entitled SAMPLE MIXING ON A MICROFLUIDIC DEVICE (Bedingham et al.); U.S. Pat. Nos. 7,192,560 and 7,871,827 and U.S. Patent Publication No. 2007/0160504, entitled METHODS AND DEVICES FOR REMOVAL OF ORGANIC MOLECULES FROM BIOLOGICAL MIXTURES USING ANION EXCHANGE (Parthasarathy et al.); U.S. Patent Publication No. 2005/0142663, entitled METHODS FOR NUCLEIC ACID ISOLATION AND KITS USING A MICROFLUIDIC DEVICE AND CONCENTRATION STEP (Parthasarathy et al.); U.S. Pat. No. 7,754,474 and U.S. Patent Publication No. 2010/0240124, entitled SAMPLE PROCESSING DEVICE COMPRESSION SYSTEMS AND METHODS (Aysta et al.); U.S. Pat. No. 7,763,210 and U.S. Patent Publication No. 2010/0266456, entitled COMPLIANT MICROFLUIDIC SAMPLE PROCESSING DISKS (Bedingham et al.); U.S. Pat. Nos. 7,323,660 and 7,767,937, entitled MODULAR SAMPLE PROCESSING APPARATUS KITS AND MODULES (Bedingham et al.); U.S. Pat. No. 7,709,249, entitled MULTIPLEX FLUORESCENCE DETECTION DEVICE HAVING FIBER BUNDLE COUPLING MULTIPLE OPTICAL MODULES TO A COMMON DETECTOR (Bedingham et al.); U.S. Pat. No. 7,507,575, entitled MULTIPLEX FLUORESCENCE DETECTION DEVICE HAVING REMOVABLE OPTICAL MODULES (Bedingham et al.); U.S. Pat. Nos. 7,527,763 and 7,867,767, entitled VALVE CONTROL SYSTEM FOR A ROTATING MULTIPLEX FLUORESCENCE DETECTION DEVICE (Bedingham et al.); U.S. Patent Publication No. 2007/0009382, entitled HEATING ELEMENT FOR A ROTATING MULTIPLEX FLUORESCENCE DETECTION DEVICE (Bedingham et al.); U.S. Patent Publication No. 2010/0129878, entitled METHODS FOR NUCLEIC AMPLIFICATION (Parthasarathy et al.); U.S. Patent Publication No. 2008/0149190, entitled THERMAL TRANSFER METHODS AND STRUCTURES FOR MICROFLUIDIC SYSTEMS (Bedingham et al.); U.S. Patent Publication No. 2008/0152546, entitled ENHANCED SAMPLE PROCESSING DEVICES, SYSTEMS AND METHODS (Bedingham et al.); U.S. Patent Publication No. 2011/0117607, entitled ANNULAR COMPRESSION SYSTEMS AND METHODS FOR SAMPLE PROCESSING DEVICES (Bedingham et al.), filed Nov. 13, 2009; U.S. Patent Publication No. 2011/0117656, entitled SYSTEMS AND METHODS FOR PROCESSING SAMPLE PROCESSING DEVICES (Robole et al.), filed Nov. 13, 2009; U.S. Provisional Patent Application No. 60/237,151 filed on Oct. 2, 2000 and entitled SAMPLE PROCESSING DEVICES, SYSTEMS AND METHODS (Bedingham et al.); U.S. Pat. Nos. D638550 and D638951, entitled SAMPLE PROCESSING DISC COVER (Bedingham et al.), filed Nov. 13, 2009; U.S. patent application No. 29/384,821, entitled SAMPLE PROCESSING DISC COVER (Bedingham et al.), filed Feb. 4, 2011; and U.S. Pat. No. D564667, entitled ROTATABLE SAMPLE PROCESSING DISK (Bedingham et al.). The entire content of these disclosures are incorporated herein by reference.

Other potential device constructions may be found in, e.g., U.S. Pat. No. 6,627,159, entitled CENTRIFUGAL FILLING OF SAMPLE PROCESSING DEVICES (Bedingham et al.); U.S. Pat. Nos. 7,026,168, 7,855,083 and 7,678,334, and U.S. Patent Publication Nos. 2006/0228811 and 2011/0053785, entitled SAMPLE PROCESSING DEVICES (Bedingham et al.); U.S. Pat. Nos. 6,814,935 and 7,445,752, entitled SAMPLE PROCESSING DEVICES AND CARRIERS (Harms et al.); and U.S. Pat. No. and 7,595,200, entitled SAMPLE PROCESSING DEVICES AND CARRIERS (Bedingham et al.). The entire content of these disclosures are incorporated herein by reference.

FIG. 1 illustrates a schematic diagram of one processing array 100 that could be present on a sample processing device of the present disclosure. The processing array 100 would generally be oriented radially with respect to a center 101 of the sample processing device, or an axis of rotation A-A about which the sample processing device can be rotated, the axis of rotation A-A extending into and out of the plane of the page of FIG. 1. That is, the processing array allows for sample materials to move in a radially outward direction (i.e., away from the center 101, toward the bottom of FIG. 1) as the sample processing device is rotated, to define a downstream direction of movement. Other lower density fluids (e.g., gases) that may be present in the microfluidic structures, will generally be displaced by the higher density fluids (e.g., liquids) and will generally flow in a radially inward direction (i.e., toward the center 101, toward the top of FIG. 1) as the sample processing device is rotated, to define an upstream direction of movement.

As shown in FIG. 1, the processing array 100 can include an input chamber 115 in fluid communication with a process (or detection) chamber 150. The processing array 100 can include an input aperture or port 110 that opens into the input chamber 115 and through which materials can be loaded into the processing array 100. The input aperture 110 can allow for raw, unprocessed samples to be loaded into the processing array 100 for analysis without requiring substantial, or any, pre-processing, diluting, measuring, mixing, or the like. As such, a sample and/or reagent can be added without precise measurement or processing. The input aperture 110 can be capped, plugged, stopped, or otherwise closed or sealed after the material(s) have been added to the processing array 100, such that the processing array 100 is thereafter closed to ambience and is "unvented," which will be described in greater detail below.

As shown, in some embodiments, the input chamber 115 can include one or more baffles or walls 116 or other suitable fluid directing structures that are positioned to divide the input chamber 115 into at least a metering portion, chamber, or reservoir 118 and a waste portion, chamber or reservoir 120. The baffles 116 can function to direct and/or contain fluid in the input chamber 115.

A sample, reagent, or other material can be loaded into the processing array 100 via the input aperture 110. As the sample processing device on which the processing array 100 is located is rotated about the axis of rotation A-A, the sample would then be directed (e.g., by the one or more baffles 116) to the metering reservoir 118. The metering reservoir 118 is configured to retain or hold a selected volume of a material, any excess being directed to the waste reservoir 120. In some embodiments, the input chamber 115, or a portion thereof, can be referred to as a "first chamber" or a "first process chamber," and the process chamber 150 can be referred to as a "second chamber" or a "second process chamber."

The metering reservoir 118 can include a first end 122 positioned toward the center 101 and the axis of rotation A-A and a second end 124 positioned away from the center 101 and axis of rotation A-A (i.e., radially outwardly of the first end 122), such that as the sample processing device is rotated, the sample is forced toward the second end 124 of the metering reservoir 118. The one or more baffles or walls 116 defining the second end 124 of the metering reservoir 118 can include a base 123 and a sidewall 126 (e.g., a partial sidewall) that are arranged to define a selected volume. The sidewall 126 is arranged to allow any volume in excess of the selected volume to overflow the sidewall 126 and run off into the waste reservoir 120. As a result, at least a portion of the waste reservoir 120 can be positioned radially outwardly of the metering reservoir 118 or of the remainder of the input chamber 115, to facilitate moving the excess volume of material into the waste reservoir 120 and inhibit the excess volume from moving back into the metering reservoir 118 under a radially-outwardly-directed force (e.g., while the sample processing device is rotated about the axis of rotation A-A).

In other words, the input chamber 115 can include one or more first baffles 116A that are positioned to direct material from the input aperture 110 toward the metering reservoir 118, and one or more second baffles 116B that are positioned to contain fluid of a selected volume and/or direct fluid in excess of the selected volume into the waste reservoir 120.

As shown, the base 123 can include an opening or fluid pathway 128 formed therein that can be configured to form at least a portion of a capillary valve 130. As a result, the cross-sectional area of the fluid pathway 128 can be small enough relative to the metering reservoir 118 (or the volume of fluid retained in the metering reservoir 118) that fluid is inhibited from flowing into the fluid pathway 128 due to capillary forces. As a result, in some embodiments, the fluid pathway 128 can be referred to as a "constriction" or "constricted pathway."

In some embodiments, the aspect ratio of a cross-sectional area of the fluid pathway 128 relative to a volume of the input chamber 115 (or a portion thereof, such as the metering reservoir 118) can be controlled to at least partially ensure that fluid will not flow into the fluid pathway 128 until desired, e.g., for a fluid of a given surface tension.

For example, in some embodiments, the ratio of the cross-sectional area of the fluid pathway ($A_p$) (e.g., at the inlet of the fluid pathway 128 at the base 123 of the metering reservoir 118) to the volume (V) of the reservoir (e.g., the input chamber 115, or a portion thereof, such as the metering reservoir 118) from which fluid may move into the fluid pathway 128, i.e., $A_p$:V, can range from about 1:25 to about 1:500, in some embodiments, can range from about 1:50 to about 1:300, and in some embodiments, can range from about 1:100 to about 1:200. Said another way, in some embodiments, the fraction of $A_p$/V can be at least about 0.01, in some embodiments, at least about 0.02, and in some embodiments, at least about 0.04. In some embodiments, the fraction of $A_p$/V can be no greater than about 0.005, in some embodiments, no greater than about 0.003, and in some embodiments, no greater than about 0.002. Reported in yet another way, in some embodiments, the fraction of V/$A_p$, or the ratio of V to $A_p$, can be at least about 25 (i.e., 25 to 1), in some embodiments, at least about 50 (i.e., about 50 to 1), and in some embodiments, at least about 100 (i.e., about 100 to 1). In some embodiments, the fraction of V/$A_p$, or the ratio of V to $A_p$, can be no greater than about 500 (i.e., about 500 to 1), in some embodiments, no greater than about 300 (i.e., about 300 to 1), and in some embodiments, no greater than about 200 (i.e., about 200 to 1).

In some embodiments, these ratios can be achieved by employing various dimensions in the fluid pathway 128. For example, in some embodiments, the fluid pathway 128 can have a transverse dimension (e.g., perpendicular to its length along a radius from the center 101, such as a diameter, a width, a depth, a thickness, etc.) of no greater than about 0.5 mm, in some embodiments, no greater than about 0.25 mm, and in some embodiments, no greater that about 0.1 mm. In some embodiments, the cross-sectional area $A_p$ fluid pathway 128 can be no greater than about 0.1 $mm^2$, in some embodiments, no greater than about 0.075 $mm^2$, and in some embodiments, no greater than about 0.5 $mm^2$. In some embodiments, the fluid pathway 128 can have a length of at least about 0.1 mm, in some embodiments, at least about 0.5 mm, and in some embodiments, at least about 1 mm. In some embodiments, the fluid pathway 128 can have a length of no greater than about 0.5 mm, in some embodiments, no greater than about 0.25 mm, and in some embodiments, no greater than about 0.1 mm. In some embodiments, for example, the fluid pathway 128 can have a width of about 0.25 mm, a depth of about 0.25 mm (i.e., a cross-sectional area of about 0.0625 $mm^2$) and a length of about 0.25 mm.

The capillary valve 130 can be located in fluid communication with the second end 124 of the metering reservoir 118, such that the fluid pathway 128 is positioned radially outwardly of the metering reservoir 118, relative to the axis of rotation A-A. The capillary valve 130 is configured to inhibit fluid (i.e., liquid) from moving from the metering reservoir 118 into the fluid pathway 128, depending on at least one of the dimensions of the fluid pathway 128, the surface energy of the surfaces defining the metering reservoir 118 and/or the fluid pathway 128, the surface tension of the fluid, the force exerted on the fluid, any backpressure that may exist (e.g., as a result of a vapor lock formed downstream, as described below), and combinations thereof. As a result, the fluid pathway 128 (e.g., the constriction) can be configured (e.g., dimensioned) to inhibit fluid from entering the valve chamber 134 until a force exerted on the fluid (e.g., by rotation of the processing array 100 about the axis of rotation A-A), the surface tension of the fluid, and/or the surface energy of the fluid pathway 128 are sufficient to move the fluid into and/or past the fluid pathway 128.

As shown in FIG. 1, the capillary valve 130 can be arranged in series with a septum valve 132, such that the capillary valve 130 is positioned radially inwardly of the septum valve 132 and in fluid communication with an inlet of the septum valve 132. The septum valve 132 can include a valve chamber 134 and a valve septum 136. In a given orientation (e.g., substantially horizontal) on a rotating platform, the capillary force can be balanced and offset by centrifugal to control fluid flow. The septum valve 132 (also sometimes referred to as a "phase-change-type valve") can be receptive to a heat source (e.g., electromagnetic energy) that can cause melting of the valve septum 136 to open a pathway through the valve septum 136.

The septum 136 can be located between the valve chamber 134 and one or more downstream fluid structures in the processing array 100, such as the process chamber 150 or any fluid channels or chambers therebetween. As such, the process chamber 150 can be in fluid communication with an outlet of the septum valve 132 (i.e., the valve chamber 134) and can be positioned at least partially radially outwardly of the valve chamber 134, relative to the axis of rotation A-A and the center 101. This arrangement of the valve septum 136 will be described in greater detail below with respect to the sample processing device 200 of FIGS. 2-8. While in some embodiments, the septum 136 can be positioned directly between the valve chamber 134 and the process chamber 150, in some embodiments, a variety of fluid structures, such as various channels or chambers, can be used to fluidly couple the valve chamber 134 and the process chamber 150. Such fluid structures are represented schematically in FIG. 1 by a dashed line and generally referred to as "distribution channel" 140.

The septum 136 can include (i) a closed configuration wherein the septum 136 is impermeable to fluids (and particularly, liquids), and positioned to fluidly isolate the valve chamber 134 from any downstream fluid structures; and (ii) an open configuration wherein the septum 136 is permeable to fluids, particularly, liquids (e.g., includes one or more openings sized to encourage the sample to flow therethrough) and allows fluid communication between the valve chamber 134 and any downstream fluid structures. That is, the valve septum 136 can prevent fluids (i.e., liquids) from moving between the valve chamber 134 and any downstream fluid structures when it is intact.

Various features and details of the valving structure and process are described in co-pending U.S. Patent Application No. 61/487,669, filed May 18, 2011 and co-pending U.S. Patent Application No. 61/490,012, filed May 25, 2011, each of which is incorporated herein by reference in its entirety.

The valve septum 136 can include or be formed of an impermeable barrier that is opaque or absorptive to electromagnetic energy, such as electromagnetic energy in the visible, infrared and/or ultraviolet spectrums. As used in connection with the present disclosure, the term "electromagnetic energy" (and variations thereof) means electromagnetic energy (regardless of the wavelength/frequency) capable of being delivered from a source to a desired location or material in the absence of physical contact. Non-limiting examples of electromagnetic energy include laser energy, radio-frequency (RF), microwave radiation, light energy (including the ultraviolet through infrared spectrum), etc. In some embodiments, electromagnetic energy can be limited to energy falling within the spectrum of ultraviolet to infrared radiation (including the visible spectrum). Various additional details of the valve septum 136 will be described below with respect to the sample processing device 200 of FIGS. 2-8.

The capillary valve 130 is shown in FIG. 1 as being in series with the septum valve 132, and particularly, as being upstream of and in fluid communication with an inlet or upstream end of the septum valve 132. Such a configuration of the capillary valve 130 and the septum valve 132 can create a vapor lock (i.e., in the valve chamber 134) when the valve septum 136 is in the closed configuration and a sample is moved and pressures are allowed to develop in the processing array 100. Such a configuration can also allow a user to control when fluid (i.e., liquid) is permitted to enter the valve chamber 134 and collect adjacent the valve septum 136 (e.g., by controlling the centrifugal force exerted on the sample, e.g., when the surface tension of the sample remains constant; and/or by controlling the surface tension of the sample). That is, the capillary valve 130 can inhibit fluid (i.e., liquids) from entering the valve chamber 134 and pooling or collecting adjacent the valve septum 136 prior to opening the septum valve 132, i.e., when the valve septum 136 is in the closed configuration.

The capillary valve 130 and the septum valve 132 can together, or separately, be referred to as a "valve" or "valving structure" of the processing array 100. That is, the valving structure of the processing array 100 is generally described above as including a capillary valve and a septum valve; however, it should be understood that in some embodiments, the valve or valving structure of the processing array 100 can simply be described as including the fluid pathway 128, the valve chamber 134, and the valve septum 136. Furthermore, in some embodiments, the fluid pathway 128 can be described as forming a portion of the input chamber 115 (e.g., as forming a portion of the metering reservoir 118), such that the downstream end 124 includes a fluid pathway 128 that is configured to inhibit fluid from entering the valve chamber 134 until desired.

By inhibiting fluid (i.e., liquid) from collecting adjacent one side of the valve septum 136, the valve septum 136 can be opened, i.e., changed form a closed configuration to an open configuration, without the interference of other matter. For example, in some embodiments, the valve septum 136 can be opened by forming a void in the valve septum 136 by directing electromagnetic energy of a suitable wavelength at one side of the valve septum 136. The present inventors discovered that, in some cases, if liquid has collected on the opposite side of the valve septum 136, the liquid may interfere with the void forming (e.g., melting) process by functioning as a heat sink for the electromagnetic energy, which can increase the power and/or time necessary to form a void in the valve septum 136. As a result, by inhibiting fluid (i.e., liquid) from collecting adjacent one side of the valve septum 136, the valve septum 136 can be opened by directing electromagnetic energy at a first side of the valve septum 136 when no fluid (e.g., a liquid, such as a sample or reagent) is present on a second side of the valve septum 136. By inhibiting fluid (e.g., liquid) from collecting on the back side of the valve septum 136, the septum valve 132 can be reliably opened across a variety of valving conditions, such as laser power (e.g., 440, 560, 670, 780, and 890 milliwatts (mW)), laser pulse width or duration (e.g., 1 or 2 seconds), and number of laser pulses (e.g., 1 or 2 pulses).

As a result, the capillary valve 130 functions to (i) effectively form a closed end of the metering reservoir 118 so that a selected volume of a material can be metered and delivered to the downstream process chamber 150, and (ii) effectively inhibit fluids (e.g., liquids) from collecting adjacent one side of the valve septum 136 when the valve septum 136 is in its closed configuration, for example, by creating a vapor lock in the valve chamber 134.

After an opening or void has been formed in the valve septum 136, the valve chamber 134 becomes in fluid communication with downstream fluid structures, such as the process chamber 150 and any distribution channel 140 therebetween, via the void in the valve septum 136. As mentioned above, after material has been loaded into the processing array 100, the input aperture 110 can be closed, sealed and/or plugged. As such, the processing array 100 can be sealed from ambience or "unvented" during processing.

By way of example only, when the sample processing device is rotated about the axis of rotation A-A at a first speed (e.g., angular velocity, reported in revolutions per minute (RPM)), a first (centrifugal) force is exerted on material in the processing array 100. The metering reservoir 118 and the fluid pathway 128 can be configured (e.g., in terms of surface energies, relative dimensions and cross-sectional areas, etc.) such that the first centrifugal force is insufficient to cause the sample of a given surface tension to be forced into the relatively narrow fluid pathway 128. However, when the sample processing device is rotated at a second speed (e.g., angular velocity, RPM), a second (centrifugal force) is exerted on material in the processing array 100. The metering reservoir 118 and the fluid pathway 128 can be configured such that the second centrifugal force is sufficient to cause the sample of a given surface tension to be forced into the fluid pathway 128. Alternatively, additives (e.g., surfactants) could be added to the sample to alter its surface tension to cause the sample to flow into the fluid pathway 128 when desired.

The first and second forces exerted on the material can also be at least partially controlled by controlling the rotation speeds and acceleration profiles (e.g., angular acceleration, reported in rotations or revolutions per square second (revolutions/$sec^2$) of the sample processing device on which the processing array 100 is located. Some embodiments can include:

(i) a first speed and a first acceleration that can be used to meter fluids in one or more processing arrays 100 on a sample processing device and are insufficient to cause the fluids to move into the fluid pathways 128 of any processing array 100 on that sample processing device;

(ii) a second speed and a first acceleration that can be used to move a fluid into the fluid pathway 128 of at least one of the processing arrays 100 on a sample processing device (e.g., in a processing array 100 in which the downstream septum valve 132 has been opened and the vapor lock in the valve chamber 134 has been released, while still inhibiting fluids from moving into the fluid pathways 128 of the remaining processing arrays 100 in which the downstream septum valve 132 has not been opened); and (iii) a third speed and a second acceleration that can be used to move fluids into the fluid pathways 128 of all processing arrays 100 on the sample processing device.

In some embodiments, the first speed can be no greater than about 1000 rpm, in some embodiments, no greater than about 975 rpm, in some embodiments, no greater than about 750 rpm, and in some embodiments, no greater than about 525 rpm. In some embodiments, the "first speed" can actually include two discrete speeds—one to move the material into the metering reservoir 118, and another to then meter the material by overfilling the metering reservoir 118 and allowing the excess to move into the waste reservoir 120. In some embodiments, the first transfer speed can be about 525 rpm, and the second metering speed can be about 975 rpm. Both can occur at the same acceleration.

In some embodiments, the first acceleration can be no greater than about 75 revolutions/$sec^2$, in some embodiments, no greater than about 50 revolutions/$sec^2$, in some embodiments, no greater than about 30 revolutions/$sec^2$, in some embodiments, no greater than about 25 revolution/$sec^2$, and in some embodiments, no greater than about 20 revolutions/$sec^2$. In some embodiments, the first acceleration can be about 24.4 revolutions/$sec^2$.

In some embodiments, the second speed can be no greater than about 2000 rpm, in some embodiments, no greater than about 1800 rpm, in some embodiments, no greater than about 1500 rpm, and in some embodiments, no greater than about 1200 rpm.

In some embodiments, the second acceleration can be at least about 150 revolutions/$sec^2$, in some embodiments, at least about 200 revolutions/$sec^2$, and in some embodiments, at least about 250 revolutions/$sec^2$. In some embodiments, the second acceleration can be about 244 revolutions/$sec^2$.

In some embodiments, the third speed can be at least about 3000 rpm, in some embodiments, at least about 3500 rpm, in some embodiments, at least about 4000 rpm, and in some embodiments, at least about 4500 rpm. However, in some embodiments, the third speed can be the same as the second speed, as long as the speed and acceleration profiles are sufficient to overcome the capillary forces in the respective fluid pathways 128.

As used in connection with the present disclosure, an "unvented processing array" or "unvented distribution system" is a processing array in which the only openings leading into the volume of the fluid structures therein are located in the input chamber 115. In other words, to reach the process chamber 150 within an unvented processing array, sample (and/or reagent) materials are delivered to the input chamber 115, and the input chamber 115 is subsequently sealed from ambience. As shown in FIG. 1, such an unvented distribution processing array may include one or more dedicated channels (e.g., distribution channel 140) to deliver the sample materials to the process chamber 150 (e.g., in a downstream direction) and one or more dedicated channels to allow air or another fluid to exit the process chamber 150 via a separate path than that in which the sample is moving. In contrast, a vented distribution system would be open to ambience during processing and would also likely include air vents positioned in one or more locations along the distribution system, such as in proximity to the process chamber 150. As mentioned above, an unvented distribution system inhibits contamination between an environment and the interior of processing array 100 (e.g., leakage from the processing array 100, or the introduction of contaminants from an environment or user into the processing array 100), and also inhibits cross-contamination between multiple samples or processing arrays 100 on one sample processing device.

As shown in FIG. 1, to facilitate fluid flow in the processing array 100 during processing, the processing array 100 can include one or more equilibrium channels 155 positioned to fluidly couple a downstream or radially outward portion of the processing array 100 (e.g., the process chamber 150) with one or more fluid structures that are upstream or radially inward of the process chamber 150 (e.g., at least a portion of the input chamber 115).

The equilibrium channel 155 is an additional channel that allows for upstream movement of fluid (e.g., gases, such as trapped air) from otherwise vapor locked downstream portions of the fluid structures to facilitate the downstream movement of other fluid (e.g., a sample material, liquids, etc.) into those otherwise vapor locked regions of the processing array 100. Such an equilibrium channel 155 can allow the fluid structures on the processing array 100 to remain unvented or closed to ambience during sample processing, i.e., during fluid movement. As a result, in some embodiments, the equilibrium channel 155 can be referred to as an "internal vent" or a "vent channel," and the process of releasing trapped fluid to facilitate material movement can be referred to as "internally venting." As described in greater detail below, with respect to the sample processing device 200 of FIGS. 2-8, in some embodiments, the equilibrium channel 155 can be formed of a series of channels or other fluid structures through which air can move sequentially to escape the process chamber 150. As such, the equilibrium channel 155 is schematically represented as a dashed line in FIG. 1.

The flow of a sample (or reagent) from the input chamber 115 to the process chamber 150 can define a first direction of movement, and the equilibrium channel 155 can define a second direction of movement that is different from the first direction. Particularly, the second direction is opposite, or substantially opposite, the first direction. When a sample (or reagent) is moved to the process chamber 150 via a force (e.g., centrifugal force), the first direction can be oriented generally along the direction of force, and the second direction can be oriented generally opposite the direction of force.

When the valve septum 136 is changed to the open configuration (e.g., by emitting electromagnetic energy at the septum 136), the vapor lock in the valve chamber 134 can be released, at least partly because of the equilibrium channel 155 connecting the downstream side of the septum 136 back up to the input chamber 115. The release of the vapor lock can allow fluid (e.g., liquid) to flow into the fluid pathway 128, into the valve chamber 134, and to the process chamber 150. In some embodiments, this phenomenon can be facilitated when the channels and chambers in the processing array 100 are hydrophobic, or generally defined by hydrophobic surfaces, particularly, as compared to aqueous samples and/or reagent materials.

In some embodiments, hydrophobicity of a material surface can be determined by measuring the contact angle between a droplet of a liquid of interest and the surface of interest. In the present case, such measurements can be made between various sample and/or reagent materials and a material that would be used in forming at least some surface of a sample processing device that would come into contact with the sample and/or reagent. In some embodiments, the sample and/or reagent materials can be aqueous liquids (e.g., suspensions, or the like). In some embodiments, the contact angle between a sample and/or reagent of the present disclosure and a substrate material forming at least a portion of the processing array 100 can be at least about 70°, in some embodiments, at least about 75°, in some embodiments, at least about 80°, in some embodiments, at least about 90°, in some embodiments, at least about 95°, and in some embodiments, at least about 99°.

In some embodiments, fluid can flow into the fluid pathway 128 when a sufficient force has been exerted on the fluid (e.g., when a threshold force on the fluid has been achieved, e.g., when the rotation of the processing array 100 about the axis of rotation A-A has exceeded a threshold acceleration or rotational acceleration). After the fluid has overcome the capillary forces in the capillary valve 130, the fluid can flow through the open valve septum 136 to downstream fluid structures (e.g., the process chamber 150).

As discussed throughout the present disclosure, the surface tension of the sample and/or reagent material being moved through the processing array 100 can affect the amount of force needed to move that material into the fluid pathway 128 and to overcome the capillary forces. Generally, the lower the surface tension of the material being moved through the processing array 100, the lower the force exerted on the material needs to be in order to overcome the capillary forces. In some embodiments, the surface tension of the sample and/or reagent material can be at least about 40 mN/m, in some embodiments, at least about 43 mN/m, in some embodiments, at least about 45 mN/m, in some embodiments, at least about 50 mN/m, in some embodiments, at least about 54 mN/m. In some embodiments, the surface tension can be no greater than about 80 nM/m, in some embodiments, no greater than about 75 mN/m, in some embodiments, no greater than about 72 mN/m, in some embodiments, no greater than about 70 mN/m, and in some embodiments, no greater than about 60 mN/m.

In some embodiments, the density of the sample and/or reagent material being moved through the processing array 100 can be at least about 1.00 g/mL, in some embodiments, at least about 1.02 g/mL, in some embodiments, at least about 1.04 g/mL. In some embodiments, the density can be no greater than about 1.08 g/mL, in some embodiments, no greater than about 1.06 g/mL, and in some embodiments, no greater than about 1.05 g/mL.

In some embodiments, the viscosity of the sample and/or reagent material being moved through the processing array 100 can be at least about 1 centipoise (nMs/m$^2$), in some embodiments, at least about 1.5 centipoise, and in some embodiments, at least about 1.75 centipoise. In some embodiments, the viscosity can be no greater than about 2.5 centipoise, in some embodiments, no greater than about 2.25 centipoise, and in some embodiments, no greater than about 2.00 centipoise. In some embodiments, the viscosity can be 1.0019 centipoise or 2.089 centipoise.

The following table includes various data for aqueous media that can be employed in the present disclosure, either as sample diluents and/or reagents. One example is a Copan Universal Transport Media ("UTM") for Viruses, Chlamydia, Mycoplasma, and Ureaplasma, 3.0 mL tube, part number 330C, lot 39P505 (Copan Diagnostics, Murrietta, Ga.). This UTM is used as the sample in the Examples. Another example is a reagent master mix ("Reagent"), available from Focus Diagnostics (Cypress, Calif.). Viscosity and density data for water at 25° C. and 25% glycerol in water are included in the following table, because some sample and/or reagent materials of the present disclosure can have material properties ranging from that of water to that of 25% glycerol in water, inclusive. The contact angle measurements in the following table were measured on a black polypropylene, which was formed by combining, at the press, Product No. P4G3Z-039 Polypropylene, natural, from Flint Hills Resources (Wichita, Kans.) with Clariant Colorant UN0055P, Deep Black (carbon black), 3% LDR, available from Clariant Corporation (Muttenz, Switzerland). Such a black polypropylene can be used in some embodiments to form at least a portion (e.g., the substrate) of a sample processing device of the present disclosure.

| Medium | Contact angle (degrees °) | Surface Tension (mN/m) | Viscosity (centipoise) | Density (g/mL) |
|---|---|---|---|---|
| UTM | 99 | 54 | — | 1.02 |
| Reagent | 71 | 43 | — | 1.022 |
| Water at 25° C. | — | 72 | 1.0019 | 1.00 |
| 25% glycerol in water | — | — | 2.089 | 1.061 |

Moving sample material within sample processing devices that include unvented processing arrays may be facilitated by alternately accelerating and decelerating the device during rotation, essentially burping the sample materials through the various channels and chambers. The rotating may be performed using at least two acceleration/deceleration cycles, i.e., an initial acceleration, followed by deceleration, second round of acceleration, and second round of deceleration.

The acceleration/deceleration cycles may not be necessary in embodiments of processing arrays that include equilibrium channels, such as the equilibrium channel 155. The equilibrium channel 155 may help prevent air or other fluids from interfering with the flow of the sample materials through the fluid structures. The equilibrium channel 155 may provide paths for displaced air or other fluids to exit the process chamber 150 to equilibrate the pressure within the distribution system, which may minimize the need for the acceleration and/or deceleration to "burp" the distribution system. However, the acceleration and/or deceleration technique may still be used to further facilitate the distribution of sample materials through an unvented distribution system. The acceleration and/or deceleration technique may also be useful to assist in moving fluids over and/or around irregular surfaces such as rough edges created by electromagnetic energy-induced valving, imperfect molded channels/chambers, etc.

It may further be helpful if the acceleration and/or deceleration are rapid. In some embodiments, the rotation may only be in one direction, i.e., it may not be necessary to reverse the direction of rotation during the loading process. Such a loading process allows sample materials to displace the air in those portions of the system that are located farther from the axis of rotation A-A than the opening(s) into the system.

The actual acceleration and deceleration rates may vary based on a variety of factors such as temperature, size of the device, distance of the sample material from the axis of rotation, materials used to manufacture the devices, properties of the sample materials (e.g., viscosity), etc. One example of a useful acceleration/deceleration process may include an initial acceleration to about 4000 revolutions per minute (rpm), followed by deceleration to about 1000 rpm over a period of about 1 second, with oscillations in rotational speed of the device between 1000 rpm and 4000 rpm at 1 second intervals until the sample materials have traveled the desired distance.

Another example of a useful loading process may include an initial acceleration of at least about 20 revolutions/sec$^2$ to first rotational speed of about 500 rpm, followed by a 5-second hold at the first rotational speed, followed by a second acceleration of at least about 20 revolutions/sec$^2$ to a second rotational speed of about 1000 rpm, followed by a 5-second hold at the second rotational speed. Another example of a useful loading process may include an initial acceleration of at least about 20 revolutions/sec$^2$ to a rotational speed of about 1800 rpm, followed by a 10-second hold at that rotational speed.

Air or another fluid within the process chamber 150 may be displaced when the process chamber 150 receives a sample material or other material. The equilibrium channel 155 may provide a path for the displaced air or other displaced fluid to pass out of the process chamber 150. The equilibrium channel 155 may assist in more efficient movement of fluid through the processing array 100 by equilibrating the pressure within processing array 100 by enabling some channels of the distribution system to be dedicated to the flow of a fluid in one direction (e.g., an upstream or downstream direction). In the processing array 100 of FIG. 1, material (e.g., the sample of interest) generally flows downstream and radially outwardly, relative to the center 101, from the input chamber 115, through the capillary valve 130 and the septum valve 132, and to the process chamber 150, optionally via the distribution channel 140. Other fluid (e.g., gases present in the process chamber 150) can generally flow upstream or radially inwardly, i.e., generally opposite that of the direction of sample movement, from the process chamber 150, through the equilibrium channel 155, to the input chamber 115.

Returning to the valving structure, the downstream side of the valve septum 136 faces and eventually opens into (e.g., after an opening or void is formed in the valve septum 136) the distribution channel 140 that fluidly couples the valve chamber 134 (and ultimately, the input chamber 115 and particularly, the metering reservoir 118) and the process chamber 150.

Force can be exerted on a material to cause it to move from the input chamber 115 (i.e., the metering reservoir 118), through the fluid pathway 128, into the valve chamber 134, through a void in the valve septum 136, along the optional distribution channel 140, and into the process chamber 150. As mentioned above, such force can be centrifugal force that can be generated by rotating a sample processing device on which the processing array 100 is located, for example, about the axis of rotation A-A, to move the material radially outwardly from the axis of rotation A-A (i.e., because at least a portion of the process chamber 150 is located radially outwardly of the input chamber 115). However, such force can also be established by a pressure differential (e.g., positive and/or negative pressure), and/or gravitational force. Under an appropriate force, the sample can traverse through the various fluid structures, to ultimately reside in the process chamber 150. Particularly, a selected volume, as controlled by the metering reservoir 118 (i.e., and baffles 116 and waste reservoir 120), of the material will be moved to the process chamber 150 after the septum valve 132 is opened and a sufficient force is exerted on the sample to move the sample through the fluid pathway 128 of the capillary valve 130.

One exemplary sample processing device, or disk, 200 of the present disclosure is shown in FIGS. 2-8. The sample processing device 200 is shown by way of example only as being circular in shape. The sample processing device 200 can include a center 201, and the sample processing device 200 can be rotated about an axis of rotation B-B that extends through the center 201 of the sample processing device 200. The sample processing device 200 can include various features and elements of the processing array 100 of FIG. 1 described above, wherein like numerals generally represent like elements. Therefore, any details, features or alternatives thereof of the features of the processing array 100 described above can be extended to the features of the sample processing device 200. Additional details and features of the sample processing device 200 can be found in co-pending U.S. Design application No. 29/392,223, filed May 18, 2011, which is incorporated herein by reference in its entirety.

Figure 8:
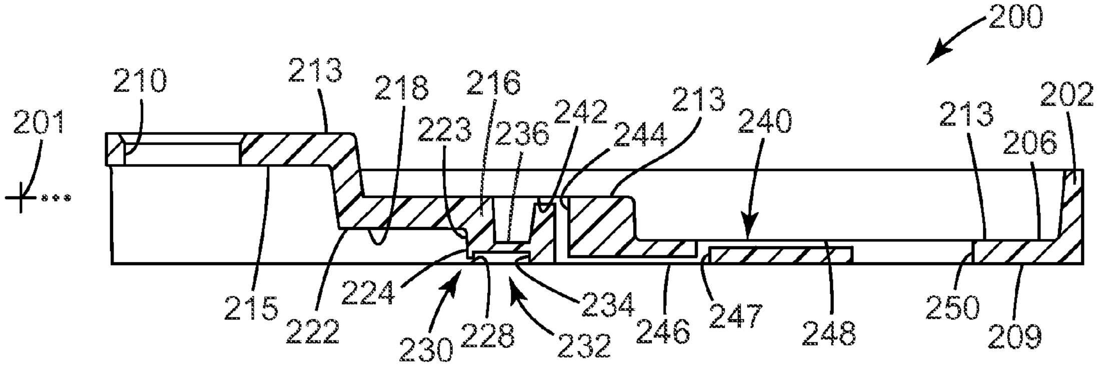
FIG. 8 is a cross-sectional side view of the sample processing device of FIGS. 2-7, taken along line 8-8 of FIG. 7.

The sample processing device 200 can be a multilayer composite structure formed of a substrate or body 202, one or more first layers 204 coupled to a top surface 206 of the substrate 202, and one or more second layers 208 coupled to a bottom surface 209 of the substrate 202. As shown in FIG. 8, the substrate 202 includes a stepped configuration with three steps or levels 213 in the top surface 206. As a result, fluid structures (e.g., chambers) designed to hold a volume of material (e.g., sample) in each step 213 of the sample processing device 200 can be at least partially defined by the substrate 202, a first layer 204, and a second layer 208. In addition, because of the stepped configuration comprising three steps 213, the sample processing device 200 can include three first layers 204, one for each step 213 of the sample processing device 200. This arrangement of fluid structures and stepped configuration is shown by way of example only, and the present disclosure is not intended to be limited by such design.

The substrate 202 can be formed of a variety of materials, including, but not limited to, polymers, glass, silicon, quartz, ceramics, or combinations thereof. In embodiments in which the substrate 202 is polymeric, the substrate 202 can be formed by relatively facile methods, such as molding. Although the substrate 202 is depicted as a homogeneous, one-piece integral body, it may alternatively be provided as a non-homogeneous body, for example, being formed of layers of the same or different materials. For those sample processing devices 200 in which the substrate 202 will be in direct contact with sample materials, the substrate 202 can be formed of one or more materials that are non-reactive with the sample materials. Examples of some suitable polymeric materials that could be used for the substrate in many different bioanalytical applications include, but are not limited to, polycarbonate, polypropylene (e.g., isotactic polypropylene), polyethylene, polyester, etc., or combinations thereof. These polymers generally exhibit hydrophobic surfaces that can be useful in defining fluid structures, as described below. Polypropylene is generally more hydrophobic than some of the other polymeric materials, such as polycarbonate or PMMA; however, all of the listed polymeric materials are generally more hydrophobic than silica-based microelectromechanical system (MEMS) devices.

Figure 3:
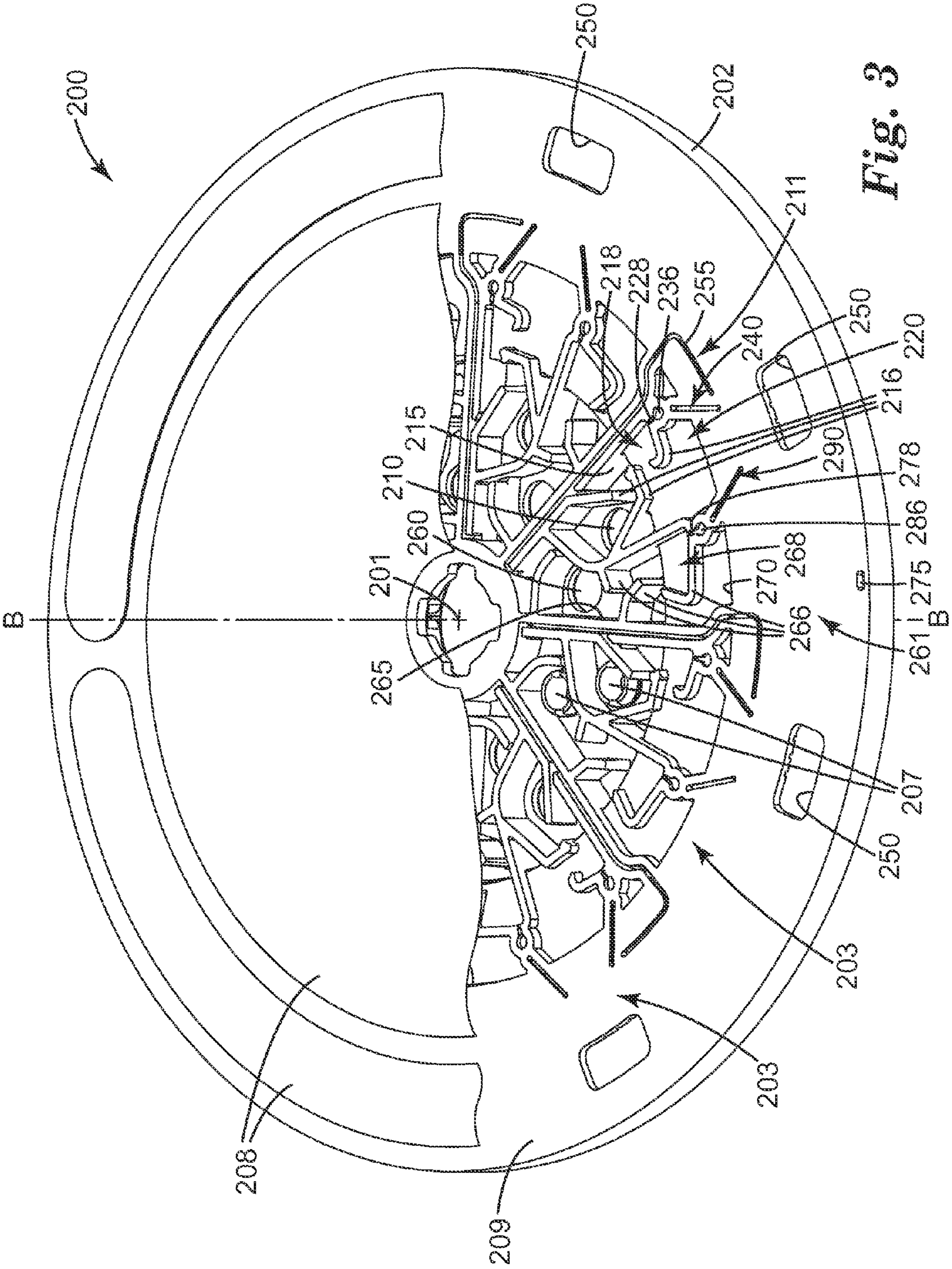
FIG. 3 is a bottom perspective view of the sample processing device of FIG. 2.
Figure 4:
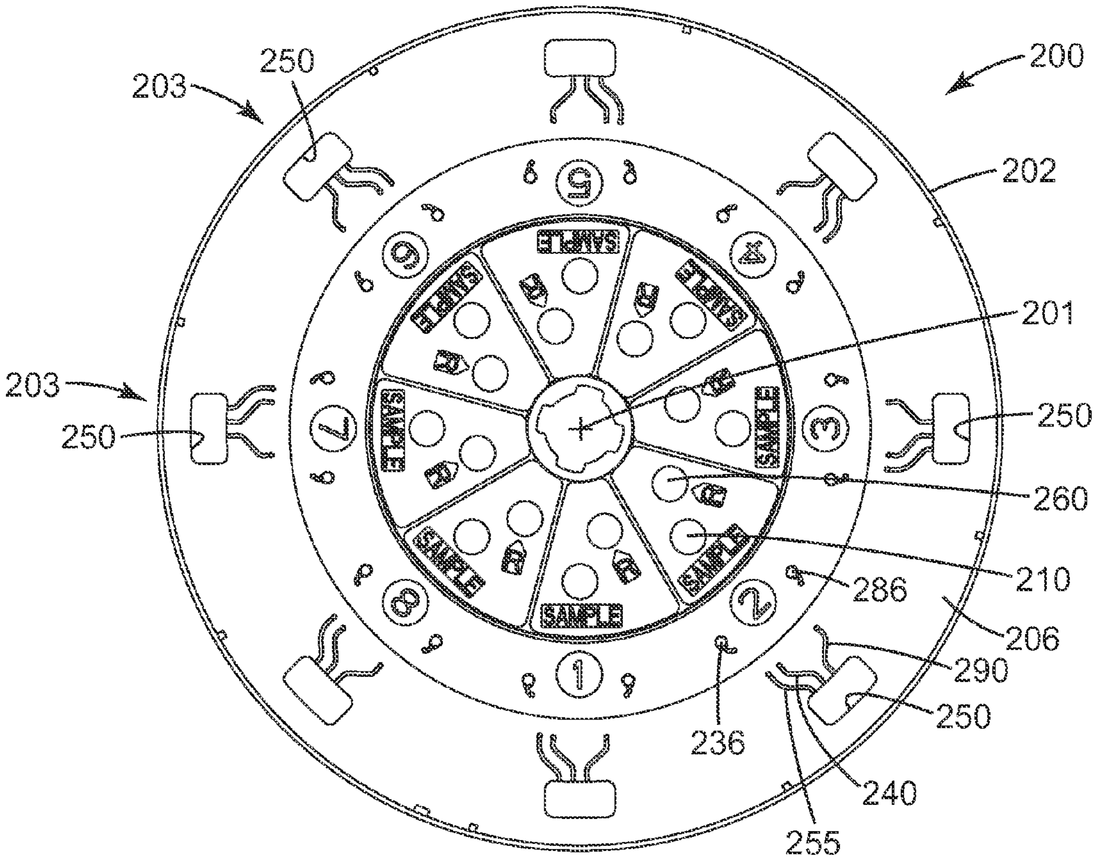
FIG. 4 is a top plan view of the sample processing device of FIGS. 2-3.
Figure 5:
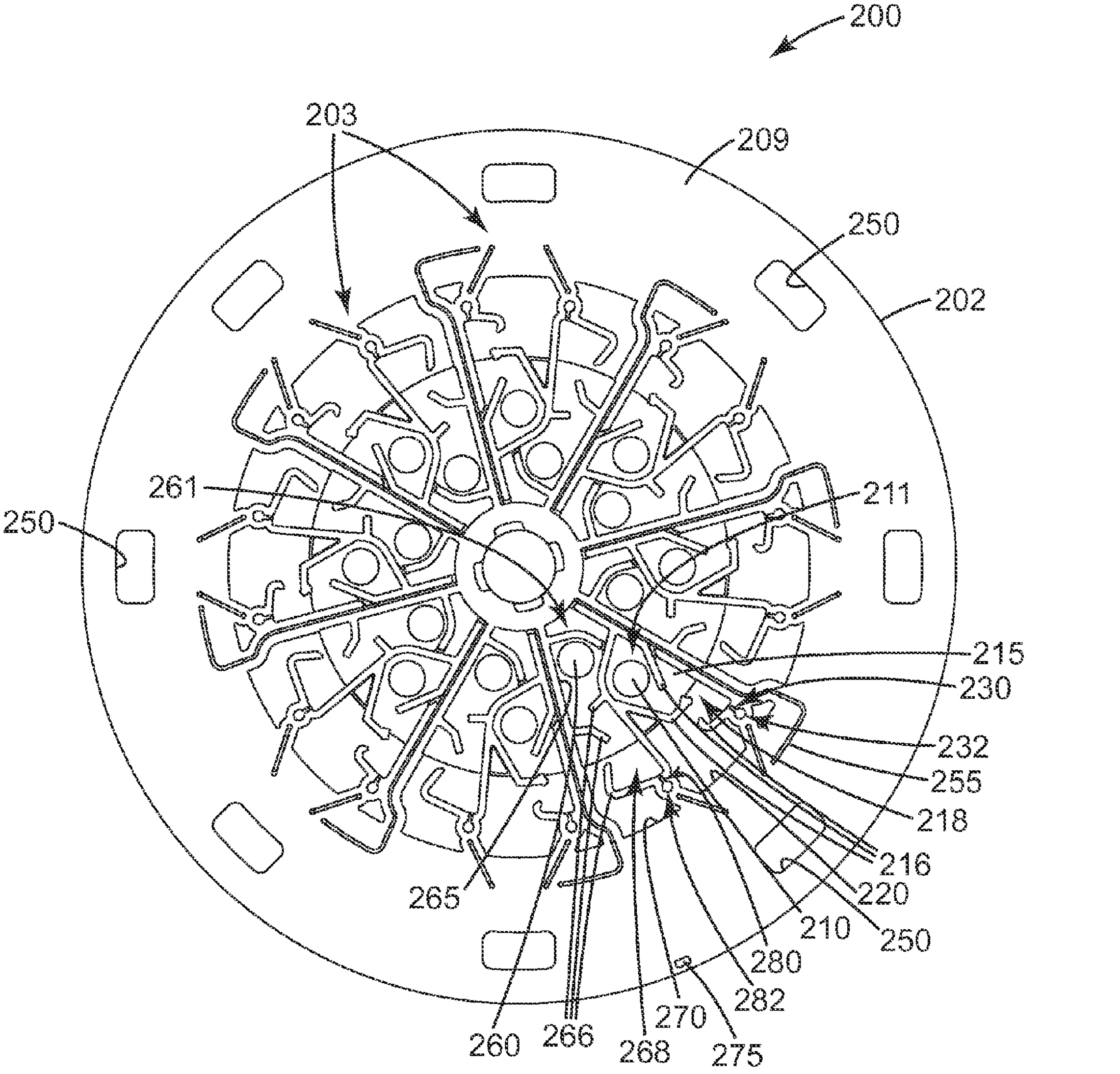
FIG. 5 is a bottom plan view of the sample processing device of FIGS. 2-4.

As shown in FIGS. 3 and 5, the sample processing device 200 can include a slot 275 formed through the substrate 202 or other structure (e.g., reflective tab, etc.) for homing and positioning the sample processing device 200, for example, relative to electromagnetic energy sources, optical modules, and the like. Such homing can be used in various valving processes, as well as other assaying or detection processes, including processes for determining whether a selected volume of material is present in the process chamber 250. Such systems and methods for processing sample processing devices are described in co-pending U.S. Application No. 61/487,618, filed May 18, 2011, which is incorporated herein by reference in its entirety.

The sample processing device 200 includes a plurality of process or detection chambers 250, each of which defines a volume for containing a sample and any other materials that are to be thermally processed (e.g., cycled) with the sample. As used in connection with the present disclosure, "thermal processing" (and variations thereof) means controlling (e.g., maintaining, raising, or lowering) the temperature of sample materials to obtain desired reactions. As one form of thermal processing, "thermal cycling" (and variations thereof) means sequentially changing the temperature of sample materials between two or more temperature setpoints to obtain desired reactions. Thermal cycling may involve, e.g., cycling between lower and upper temperatures, cycling between lower, upper, and at least one intermediate temperature, etc.

The illustrated device 200 includes eight detection chambers 250, one for each lane 203, although it will be understood that the exact number of detection chambers 250 provided in connection with a device manufactured according to the present disclosure may be greater than or less than eight, as desired.

The process chambers 250 in the illustrative device 200 are in the form of chambers, although the process chambers in devices of the present disclosure may be provided in the form of capillaries, passageways, channels, grooves, or any other suitably defined volume.

In some embodiments, the substrate 202, the first layers 204, and the second layers 208 of the sample processing device 200 can be attached or bonded together with sufficient strength to resist the expansive forces that may develop within the process chambers 250 as, e.g., the constituents located therein are rapidly heated during thermal processing. The robustness of the bonds between the components may be particularly important if the device 200 is to be used for thermal cycling processes, e.g., PCR amplification. The repetitive heating and cooling involved in such thermal cycling may pose more severe demands on the bond between the sides of the sample processing device 200. Another potential issue addressed by a more robust bond between the components is any difference in the coefficients of thermal expansion of the different materials used to manufacture the components.

The first layers 204 can be formed of a transparent, opaque or translucent film or foil, such as adhesive-coated polyester, polypropylene or metallic foil, or combinations thereof, such that the underlying structures of the sample processing device 200 are visible. The second layers 208 can be transparent, or opaque but are often formed of a thermally-conductive metal (e.g., a metal foil) or other suitably thermally conductive material to transmit heat or cold by conduction from a platen and/or thermal structure (e.g., coupled to or forming a portion of the rotating platform 25) to which the sample processing device 200 is physically coupled (and/or urged into contact with) to the sample processing device 200, and particularly, to the detection chambers 250, when necessary.

The first and second layers 204 and 208 can be used in combination with any desired passivation layers, adhesive layers, other suitable layers, or combinations thereof, as described in U.S. Pat. No. 6,734,401, and U.S. Patent Application Publication Nos. 2008/0314895 and 2008/0152546. In addition, the first and second layers 204 and 208 can be coupled to the substrate 202 using any desired technique or combination of techniques, including, but not limited to, adhesives, welding (chemical, thermal, and/or sonic), etc., as described in U.S. Pat. No. 6,734,401, and U.S. Patent Application Publication Nos. 2008/0314895 and 2008/0152546.

By way of example only, the sample processing device 200 is shown as including eight different lanes, wedges, portions or sections 203, each lane 203 being fluidly isolated from the other lanes 203, such that eight different samples can be processed on the sample processing device 200, either at the same time or at different times (e.g., sequentially). To inhibit cross-contamination between lanes 203, each lane can be fluidly isolated from ambience, both prior to use and during use, for example, after a raw sample has been loaded into a given lane 203 of the sample processing device 200. For example, as shown in FIG. 2, in some embodiments, the sample processing device 200 can include a pre-use layer 205 (e.g., a film, foil, or the like comprising a pressure-sensitive adhesive) as the innermost first layer 204 that can be adhered to at least a portion of the top surface 206 of the sample processing device 200 prior to use, and which can be selectively removed (e.g., by peeling) from a given lane 203 prior to use of that particular lane.

Figure 2:
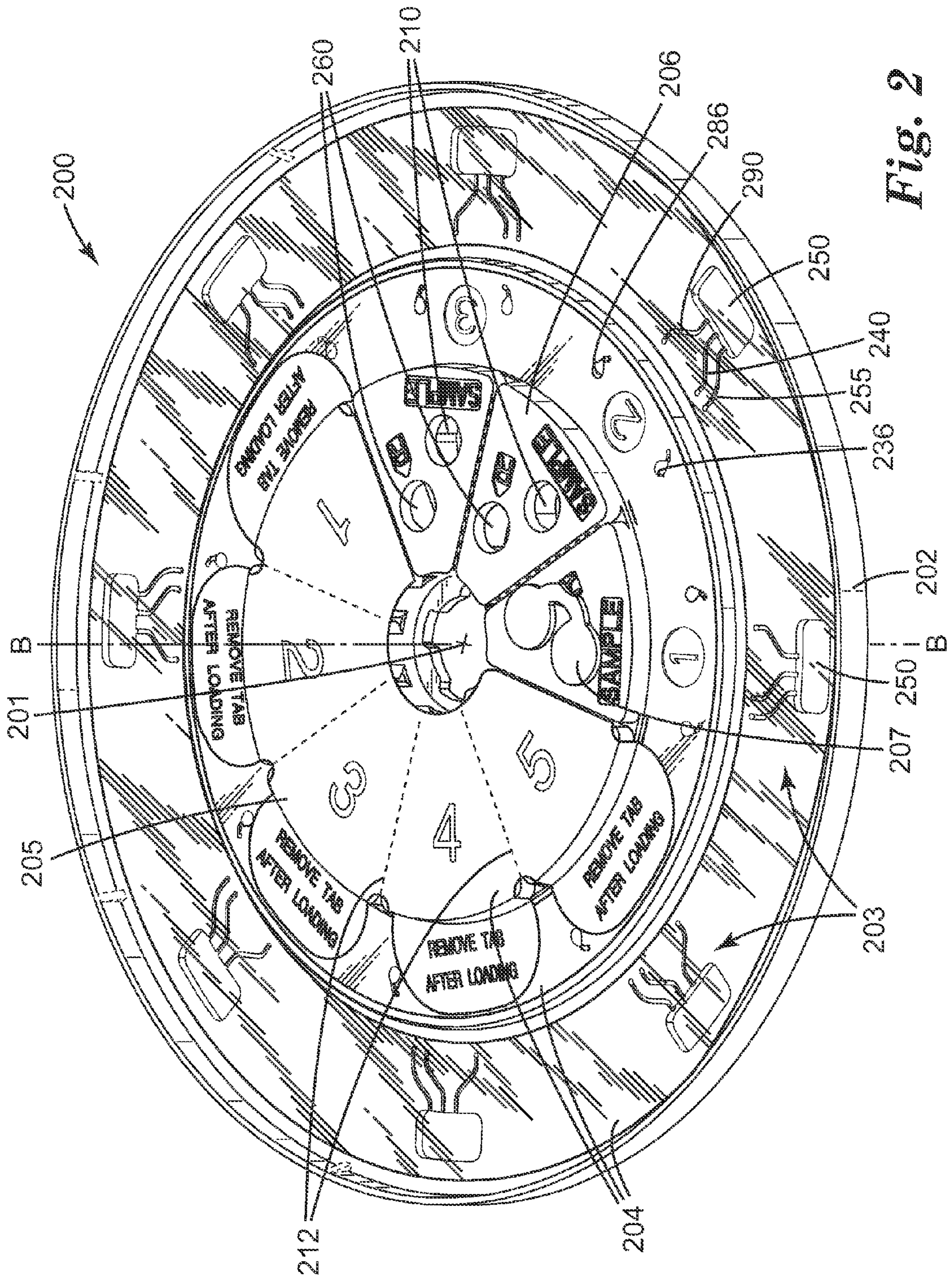
FIG. 2 is a top perspective view of a sample processing device according to one embodiment of the present disclosure.

As shown in FIG. 2, in some embodiments, the pre-use layer 205 can include folds, perforations or score lines 212 to facilitate removing only a portion of the pre-use layer 205 at a time to selectively expose one or more lanes 203 of the sample processing device 200 as desired. In addition, in some embodiments, as shown in FIG. 2, the pre-use layer 205 can include one or more tabs (e.g., one tab per lane 203) to facilitate grasping an edge of the pre-use layer 205 for removal. In some embodiments, the sample processing device 200 and/or the pre-use layer 205 can be numbered adjacent each of the lanes 203 to clearly differentiate the lanes 203 from one another. As shown by way of example in FIG. 2, the pre-use layer 205 has been removed from lane numbers 1-3 of the sample processing device 200, but not from lane numbers 4-8. Where the pre-use layer 205 has been removed from the sample processing device 200, a first input aperture 210 designated "SAMPLE" and a second input aperture 260 designated "R" for reagent are revealed.

In addition, to further inhibit cross-contamination between lanes 203, between a reagent material handling portion of a lane 203 and a sample material handling portion of the lane 203, and/or between ambience and the interior of the sample processing device 200, one or both of the first and second input apertures 210 and 260 can be plugged or stopped, for example, with a plug 207 such as that shown in FIG. 2. A variety of materials, shapes and constructions can be employed to plug the input apertures 210 and 260, and the plug 207 is shown by way of example only as being a combination plug that can be inserted with one finger-press into both the first input aperture 210 and the second input aperture 260. Alternatively, in some embodiments, the pre-use layer 205 can also serve as a seal or cover layer and can be reapplied to the top surface 206 of a particular lane 203 after a sample and/or reagent has been loaded into that lane 203 to re-seal the lane 203 from ambience. In such embodiments, the tab of each section of the pre-use layer 205 can be removed from the remainder of the layer 205 (e.g., torn along perforations) after the layer 205 has been reapplied to the top surface 206 of the corresponding lane 203. Removal of the tab can inhibit any interference that may occur between the tab and any processing steps, such as valving, disk spinning, etc. In addition, in such embodiments, the pre-use layer 205 can be peeled back just enough to expose the first and second input apertures 210 and 260, and then laid back down upon the top surface 206, such that the pre-use layer 205 is never fully removed from the top surface 206. For example, in some embodiments, the perforations or score lines 212 between adjacent sections of the pre-use layer 205 can end at a through-hole that can act as a tear stop. Such a through-hole can be positioned radially outwardly of the innermost edge of the pre-use layer 205, such that the innermost portion of each section of the pre-use layer 205 need not be fully removed from the top surface 206.

Figure 6:
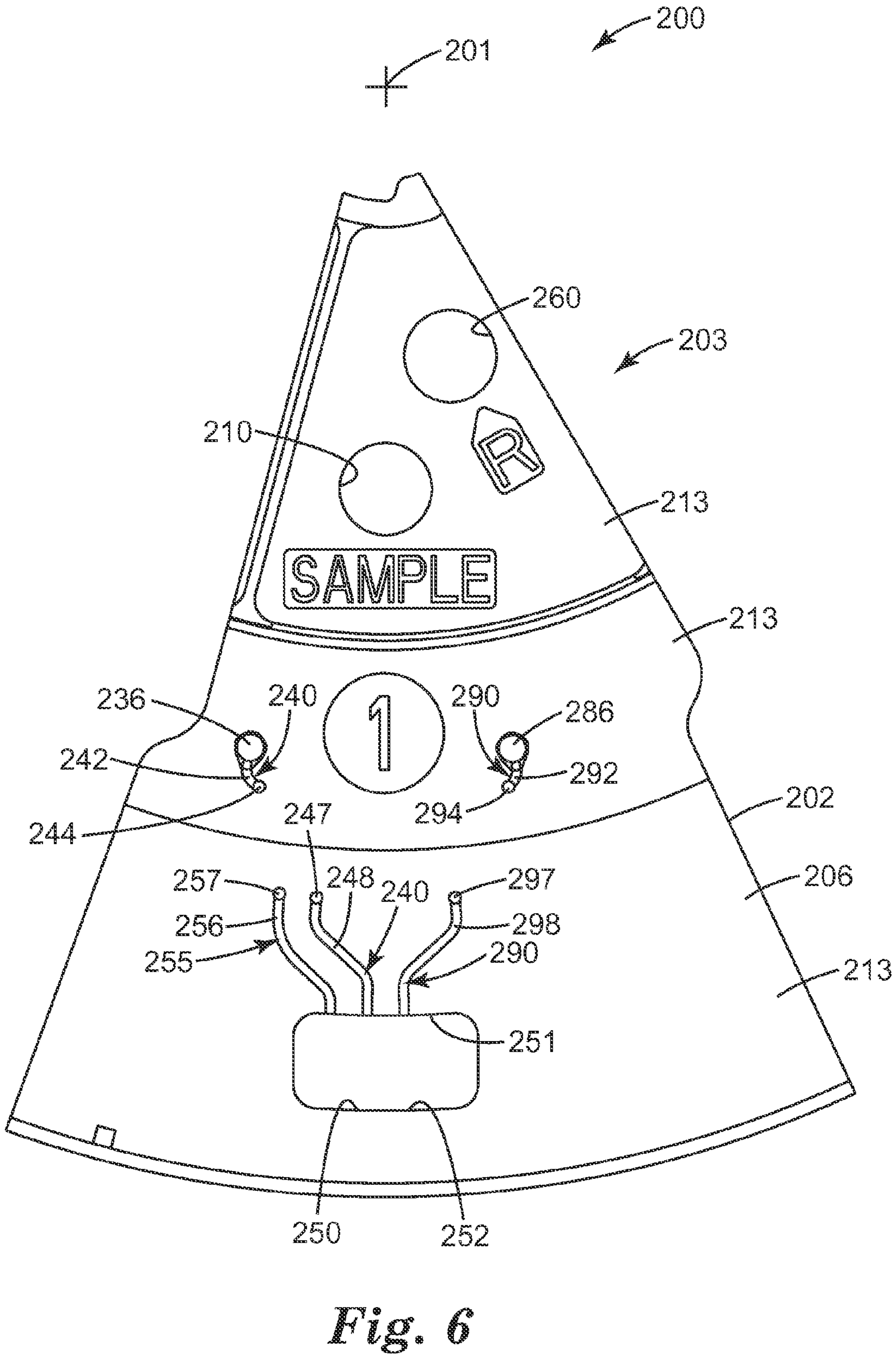
FIG. 6 is a close-up top plan view of a portion of the sample processing device of FIGS. 2-5.
Figure 7:
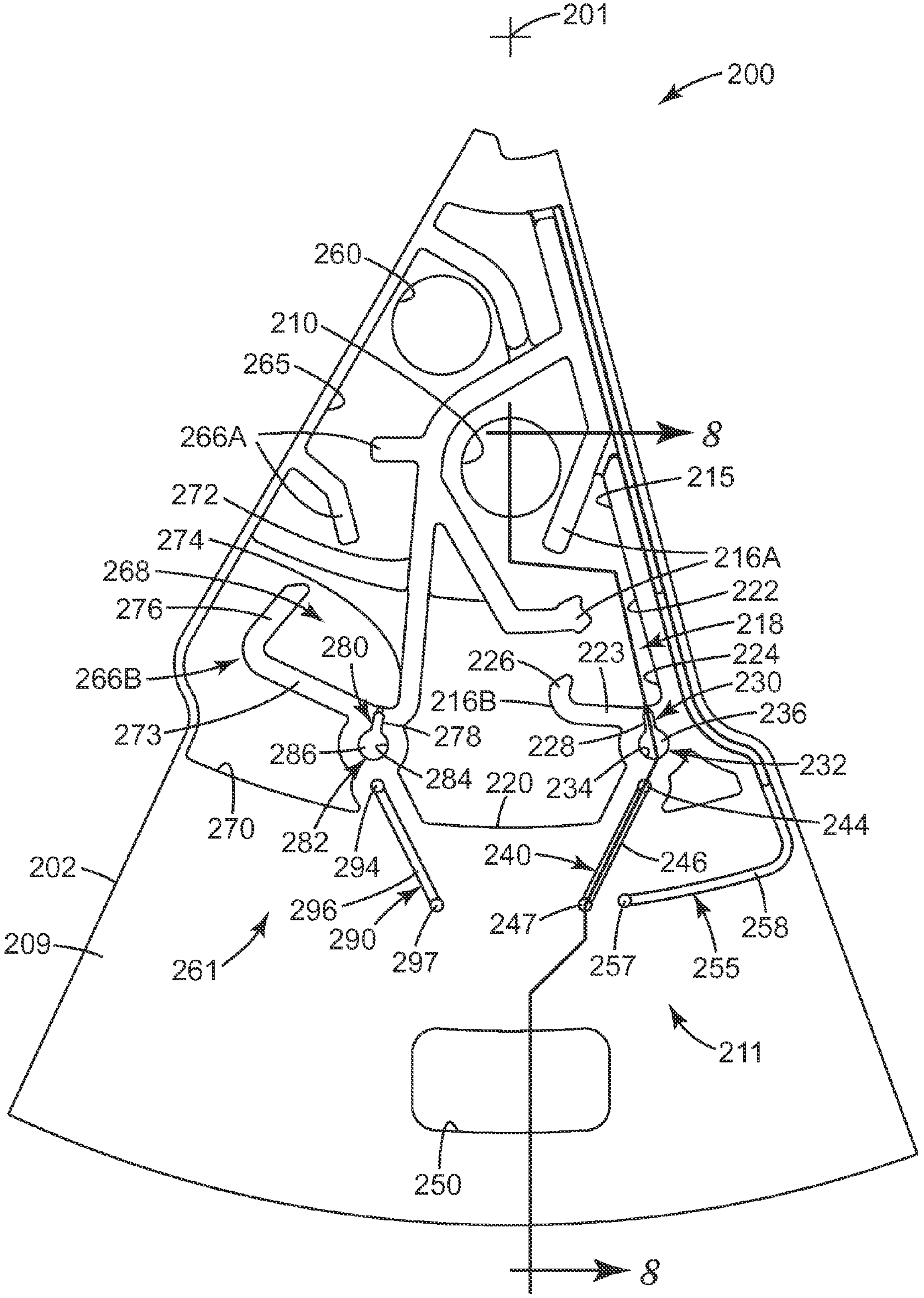
FIG. 7 is a close-up bottom plan view of the portion of the sample processing device shown in FIG. 6.

As shown in FIGS. 3, 5 and 7, in the illustrated embodiment of FIGS. 2-8, each lane 203 of the sample processing device 200 includes a sample handling portion or side 211 of the lane 203 and a reagent handling portion or side 261 of the lane 203, and the sample handling portion 211 and the reagent handling portion 261 can be fluidly isolated from one another, until the two sides are brought into fluid communication with one another, for example, by opening one or more valves, as described below. Each lane 203 can sometimes be referred to as a "distribution system" or "processing array," or in some embodiments, each side 211, 261 of the lane 203 can be referred to as a "distribution system" or "processing array" and can generally correspond to the processing array 100 of FIG. 1. Generally, however, a "processing array" refers to an input chamber, a detection chamber, and any fluid connections therebetween.

With reference to FIGS. 3, 5 and 7, the first input aperture 210 opens into an input well or chamber 215. A similar input chamber 265 is located on the reagent handling side 261 of the lane 203 into which the second input aperture 260 opens. The separate sample and reagent input apertures 210 and 260, input chambers 215 and 265, and handling sides 211 and 261 of each lane 203 allow for raw, unprocessed samples to be loaded onto the sample processing device 200 for analysis without requiring substantial, or any, pre-processing, diluting, measuring, mixing, or the like. As such, the sample and/or the reagent can be added without precise measurement or processing. As a result, the sample processing device 200 can sometimes be referred to as a "moderate complexity" disk, because relatively complex on-board processing can be performed on the sample processing device 200 without requiring much or any pre-processing. The sample handling side 211 will be described first.

As shown, in some embodiments, the input chamber 215 can include one or more baffles or walls 216 or other suitable fluid directing structures that are positioned to divide the input chamber 215 into at least a metering portion, chamber, or reservoir 218 and a waste portion, chamber or reservoir 220. The baffles 216 can function to direct and/or contain fluid in the input chamber 215.

As shown in the illustrated embodiment, a sample can be loaded onto the sample processing device 200 into one or more lanes 203 via the input aperture 210. As the sample processing device 200 is rotated about the axis of rotation B-B, the sample would then be directed (e.g., by the one or more baffles 216) to the metering reservoir 218. The metering reservoir 218 is configured to retain or hold a selected volume of a material, any excess being directed to the waste reservoir 220. In some embodiments, the input chamber 215, or a portion thereof, can be referred to as a "first chamber" or a "first process chamber," and the process chamber 250 can be referred to as a "second chamber" or a "second process chamber."

As shown in FIGS. 7 and 8, the metering reservoir 218 includes a first end 222 positioned toward the center 201 of the sample processing device 200 and the axis of rotation B-B, and a second end 224 positioned away from the center 201 and the axis of rotation B-B (i.e., radially outwardly of the first end 222), such that as the sample processing device 200 is rotated, the sample is forced toward the second end 224 of the metering reservoir 218. The one or more baffles or walls 216 defining the second end 224 of the metering reservoir 218 can include a base 223 and a sidewall 226 (e.g., a partial sidewall; see FIG. 7) that are arranged to define a selected volume. The sidewall 226 is arranged and shaped to allow any volume in excess of the selected volume to overflow the sidewall 226 and run off into the waste reservoir 220. As a result, at least a portion of the waste reservoir 220 can be positioned radially outwardly of the metering reservoir 218 or of the remainder of the input chamber 215, to facilitate moving the excess volume of material into the waste reservoir 220 and inhibit the excess volume from moving back into the metering reservoir 218 under a radially-outwardly-directed force (e.g., while the sample processing device 200 is rotated about the axis of rotation B-B).

In other words, with continued reference to FIG. 7, the input chamber 215 can include one or more first baffles 216A that are positioned to direct material from the input aperture 210 toward the metering reservoir 218, and one or more second baffles 216B that are positioned to contain fluid of a selected volume and/or direct fluid in excess of the selected volume into the waste reservoir 220.

As shown, the base 223 can include an opening or fluid pathway 228 formed therein that can be configured to form at least a portion of a capillary valve 230. As a result, the cross-sectional area of the fluid pathway 228 can be small enough relative to the metering reservoir 218 (or the volume of fluid retained in the metering reservoir 218) that fluid is inhibited from flowing into the fluid pathway 228 due to capillary forces. As a result, in some embodiments, the fluid pathway 228 can be referred to as a "constriction" or "constricted pathway."

In some embodiments, the metering reservoir 218, the waste reservoir 220, one or more of the baffles 216 (e.g., the base 223, the sidewall 226, and optionally one or more first baffles 216A), and the fluid pathway 228 (or the capillary valve 230) can together be referred to as a "metering structure" responsible for containing a selected volume of material, for example, that can be delivered to downstream fluid structures when desired.

By way of example only, when the sample processing device 200 is rotated about the axis of rotation B-B at a first speed (e.g., angular velocity, RPM), a first centrifugal force is exerted on material in the sample processing device 200. The metering reservoir 218 and the fluid pathway 228 can be configured (e.g., in terms of surface energies, relative dimensions and cross-sectional areas, etc.) such that the first centrifugal force is insufficient to cause the sample of a given surface tension to be forced into the relatively narrow fluid pathway 228. However, when the sample processing device 200 is rotated at a second speed (e.g., angular velocity, RPM), a second centrifugal force is exerted on material in the sample processing device 200. The metering reservoir 218 and the fluid pathway 228 can be configured such that the second centrifugal force is sufficient to cause the sample of a given surface tension to be forced into the fluid pathway 228. Alternatively, additives (e.g., surfactants) could be added to the sample to alter its surface tension to cause the sample to flow into the fluid pathway 228 when desired. In some embodiments, the first and second forces can be at least partially controlled by controlling the acceleration profiles and speeds at which the sample processing device 200 is rotated at different processing stages. Examples of such speeds and accelerations are described above with respect to FIG. 1.

In some embodiments, the aspect ratio of a cross-sectional area of the fluid pathway 228 relative to a volume of the input chamber 215 (or a portion thereof, such as the metering reservoir 218) can be controlled to at least partially ensure that fluid will not flow into the fluid pathway 228 until desired, e.g., for a fluid of a given surface tension.

For example, in some embodiments, the ratio of the cross-sectional area of the fluid pathway ($A_p$) (e.g., at the inlet of the fluid pathway 228 at the base 223 of the metering reservoir 218) to the volume (V) of the reservoir (e.g., the input chamber 215, or a portion thereof, such as the metering reservoir 218) from which fluid may move into the fluid pathway 228, i.e., $A_p$: V, can be controlled. Any of the various ratios, and ranges thereof, detailed above with respect to FIG. 1 can be employed in the sample processing device 200 as well.

As shown in the FIGS. 3, 5, 7 and 8, the capillary valve 230 can be located in fluid communication with the second end 224 of the metering reservoir 218, such that the fluid pathway 228 is positioned radially outwardly of the metering reservoir 218, relative to the axis of rotation B-B. The capillary valve 230 is configured to inhibit fluid (i.e., liquid) from moving from the metering reservoir 218 into the fluid pathway 228, depending on at least one of the dimensions of the fluid pathway 228, the surface energy of the surfaces defining the metering reservoir 218 and/or the fluid pathway 228, the surface tension of the fluid, the force exerted on the fluid, any backpressure that may exist (e.g., as a result of a vapor lock formed downstream, as described below), and combinations thereof. As a result, the fluid pathway 128 (e.g., the constriction) can be configured (e.g., dimensioned) to inhibit fluid from entering the valve chamber 134 until a force exerted on the fluid (e.g., by rotation of the processing array 100 about the axis of rotation A-A), the surface tension of the fluid, and/or the surface energy of the fluid pathway 128 are sufficient to move the fluid past the fluid pathway 128 and into the valve chamber 134.

As shown in the illustrated embodiment, the capillary valve 230 can be arranged in series with a septum valve 232, such that the capillary valve 230 is positioned radially inwardly of the septum valve 232 and in fluid communication with an inlet of the septum valve 232. The septum valve 232 can include a valve chamber 234 and a valve septum 236. The septum 236 can be located between the valve chamber 234 and one or more downstream fluid structures in the sample processing device 200. The septum 236 can include (i) a closed configuration wherein the septum 236 is impermeable to fluids (and particularly, liquids), and positioned to fluidly isolate the valve chamber 234 from any downstream fluid structures; and (ii) an open configuration wherein the septum 236 is permeable to fluids, particularly, liquids (e.g., includes one or more openings sized to encourage the sample to flow therethrough) and allows fluid communication between the valve chamber 234 and any downstream fluid structures. That is, the valve septum 236 can prevent fluids (i.e., liquids) from moving between the valve chamber 234 and any downstream fluid structures when it is intact.

As mentioned above with respect to the valve septum 136 of FIG. 1, the valve septum 236 can include or be formed of an impermeable barrier that is opaque or absorptive to electromagnetic energy.

The valve septum 236, or a portion thereof, may be distinct from the substrate 202 (e.g., made of a material that is different than the material used for the substrate 202). By using different materials for the substrate 202 and the valve septum 236, each material can be selected for its desired characteristics. Alternatively, the valve septum 236 may be integral with the substrate 202 and made of the same material as the substrate 202. For example, the valve septum 236 may simply be molded into the substrate 202. If so, it may be coated or impregnated to enhance its ability to absorb electromagnetic energy.

The valve septum 236 may be made of any suitable material, although it may be particularly useful if the material of the septum 236 forms voids (i.e., when the septum 236 is opened) without the production of any significant byproducts, waste, etc. that could interfere with the reactions or processes taking place in the sample processing device 200. One example of a class of materials that can be used as the valve septum 236, or a portion thereof, include pigmented oriented polymeric films, such as, for example, films used to manufacture commercially available can liners or bags. A suitable film may be a black can liner, 1.18 mils thick, available from Himolene Incorporated, of Danbury, Conn. under the designation 406230E. However, in some embodiments, the septum 236 can be formed of the same material as the substrate 202 itself, but may have a smaller thickness than other portions of the substrate 202. The septum thickness can be controlled by the mold or tool used to form the substrate 202, such that the septum is thin enough to sufficiently be opened by absorbing energy from an electromagnetic signal.

In some embodiments, the valve septum 236 can have a cross-sectional area of at least about 1 $mm^2$, in some embodiments, at least about 2 $mm^2$, and in some embodiments, at least about 5 $mm^2$ In some embodiments, the valve septum 236 can have a cross-sectional area of no greater than about 10 $mm^2$, in some embodiments, no greater than about 8 $mm^2$, and in some embodiments, no greater than about 6 $mm^2$ In some embodiments, the valve septum 236 can have a thickness of at least about 0.1 mm, in some embodiments, at least about 0.25 mm, and in some embodiments, at least about 0.4 mm. In some embodiments, the valve septum 236 can have a thickness of no greater than about 1 mm, in some embodiments, no greater than about 0.75 mm, and in some embodiments, no greater than about 0.5 mm.

In some embodiments, the valve septum 236 can be generally circular in shape, can have a diameter of about 1.5 mm (i.e., a cross-sectional area of about 5.3 $mm^2$), and a thickness of about 0.4 mm.

In some embodiments, the valve septum 236 can include material susceptible of absorbing electromagnetic energy of selected wavelengths and converting that energy to heat, resulting in the formation of a void in the valve septum 236. The absorptive material may be contained within the valve septum 236, or a portion thereof (e.g., impregnated in the material (resin) forming the septum), or coated on a surface thereof. For example, as shown in FIG. 6, the valve septum 236 can be configured to be irradiated with electromagnetic energy from the top (i.e., at the top surface 206 of the substrate 202). As a result, the first layer 204 over the valve septum region (see FIG. 2) can be transparent to the selected wavelength, or range of wavelengths, of electromagnetic energy used to create a void in the valve septum 236, and the valve septum 236 can be absorptive of such wavelength(s).

The capillary valve 230 is shown in the embodiment illustrated in FIGS. 2-8 as being in series with the septum valve 232, and particularly, as being upstream of and in fluid communication with an inlet or upstream end of the septum valve 232. As shown, the capillary valve 230 is positioned radially inwardly of the septum valve 232. Such a configuration of the capillary valve 230 and the septum valve 232 can create a vapor lock (i.e., in the valve chamber 234) when the valve septum 236 is in the closed configuration and a sample is moved and pressures are allowed to develop in the sample processing device 200. Such a configuration can also allow a user to control when fluid (i.e., liquid) is permitted to enter the valve chamber 234 and collect adjacent the valve septum 236 (e.g., by controlling the speed at which the sample processing device 200 is rotated, which affects the centrifugal force exerted on the sample, e.g., when the surface tension of the sample remains constant; and/or by controlling the surface tension of the sample). That is, the capillary valve 230 can inhibit fluid (i.e., liquids) from entering the valve chamber 234 and pooling or collecting adjacent the valve septum 236 prior to opening the septum valve 232, i.e., when the valve septum 236 is in the closed configuration. The capillary valve 230 and the septum valve 232 can together, or separately, be referred to as a "valving structure" of the sample processing device 200.

By inhibiting fluid (i.e., liquid) from collecting adjacent one side of the valve septum 236, the valve septum 236 can be opened, i.e., changed form a closed configuration to an open configuration, without the interference of other matter. For example, in some embodiments, the valve septum 236 can be opened by forming a void in the valve septum 236 by directing electromagnetic energy of a suitable wavelength at one side of the valve septum 236 (e.g., at the top surface 206 of the sample processing device 200). As mentioned above, the present inventors discovered that, in some cases, if liquid has collected on the opposite side of the valve septum 236, the liquid may interfere with the void forming (e.g., melting) process by functioning as a heat sink for the electromagnetic energy, which can increase the power and/or time necessary to form a void in the valve septum 236. As a result, by inhibiting fluid (i.e., liquid) from collecting adjacent one side of the valve septum 236, the valve septum 236 can be opened by directing electromagnetic energy at a first side of the valve septum 236 when no fluid (e.g., a liquid, such as a sample or reagent) is present on a second side of the valve septum 236.

As a result, the capillary valve 230 functions to (i) effectively form a closed end of the metering reservoir 218 so that a selected volume of a material can be metered and delivered to the downstream process chamber 250, and (ii) effectively inhibit fluids (e.g., liquids) from collecting adjacent one side of the valve septum 236 when the valve septum 236 is in its closed configuration, for example, by creating a vapor lock in the valve chamber 234.

In some embodiments, the valving structure can include a longitudinal direction oriented substantially radially relative to the center 201 of the sample processing device 200. In some embodiments, the valve septum 236 can include a length that extends in the longitudinal direction greater than the dimensions of one or more openings or voids that may be formed in the valve septum 236, such that one or more openings can be formed along the length of the valve septum 236 as desired. That is, in some embodiments, it may be possible to remove selected aliquots of a sample by forming openings at selected locations along the length in the valve septum 236. The selected aliquot volume can be determined based on the radial distance between the openings (e.g., measured relative to the axis of rotation B-B) and the cross-sectional area of the valve chamber 234 between openings. Other embodiments and details of such a "variable valve" can be found in U.S. Pat. No. 7,322,254 and U.S. Patent Application Publication No. 2010/0167304.

After an opening or void has been formed in the valve septum 236, the valve chamber 234 becomes in fluid communication with downstream fluid structures, such as the process chamber 250, via the void in the valve septum 236. As mentioned above, after a sample has been loaded into the sample handling side 211 of the lane 203, the first input aperture 210 can be closed, sealed and/or plugged. As such, the sample processing device 200 can be sealed from ambience or "unvented" during processing.

As used in connection with the present disclosure, an "unvented processing array" or "unvented distribution system" is a distribution system (i.e., processing array or lane 203) in which the only openings leading into the volume of the fluid structures therein are located in the input chamber 215 for the sample (or the input chamber 265 for the reagent). In other words, to reach the process chamber 250 within an unvented processing array, sample (and/or reagent) materials are delivered to the input chamber 215 (or the input chamber 265), and the input chamber 215 is subsequently sealed from ambience. As shown in FIGS. 2-8, such an unvented processing array may include one or more dedicated channels to deliver the sample materials to the process chamber 250 (e.g., in a downstream direction) and one or more dedicated channels to allow air or another fluid to exit the process chamber 250 via a separate path than that in which the sample is moving. In contrast, a vented distribution system would be open to ambience during processing and would also likely include air vents positioned in one or more locations along the processing array, such as in proximity to the process chamber 250. As mentioned above, an unvented processing array inhibits contamination between an environment and the interior of the sample processing device 200 (e.g., leakage from the sample processing device 200, or the introduction of contaminants from an environment or user into the sample processing device 200), and also inhibits cross-contamination between multiple samples or lanes 203 on one sample processing device 200.

As shown in FIGS. 3, 5, and 7, to facilitate fluid flow in the sample processing device 200 during processing, the lane 203 can include one or more equilibrium channels 255 positioned to fluidly couple a downstream or radially outward portion of the lane 203 (e.g., the process chamber 250) with one or more fluid structures that are upstream or radially inward of the process chamber 250 (e.g., at least a portion of the input chamber 215, at least a portion of the input chamber 265 on the reagent handling side 261, or both).

By way of example only, each lane 203 of the illustrated sample processing device 200, as shown in FIGS. 6 and 7, includes an equilibrium channel 255 positioned to fluidly couple the process chamber 250 with an upstream, or radially inward (i.e., relative to the center 201) portion of the reagent input chamber 265 on the reagent handling side 261 of the lane 203. The equilibrium channel 255 is an additional channel that allows for upstream movement of fluid (e.g., gases, such as trapped air) from otherwise vapor locked downstream portions of the fluid structures to facilitate the downstream movement of other fluid (e.g., a sample material, liquids, etc.) into those otherwise vapor locked regions of the sample processing device 200. Such an equilibrium channel 255 allows the fluid structures on the sample processing device 200 to remain unvented or closed to ambience during sample processing, i.e., during fluid movement on the sample processing device 200. As a result, in some embodiments, the equilibrium channel 255 can be referred to as an "internal vent" or a "vent channel," and the process of releasing trapped fluid to facilitate material movement can be referred to as "internally venting."

Said another way, in some embodiments, the flow of a sample (or reagent) from an input chamber 215 (or the reagent input chamber 265) to the process chamber 250 can define a first direction of movement, and the equilibrium channel 255 can define a second direction of movement that is different from the first direction. Particularly, the second direction is opposite, or substantially opposite, the first direction. When a sample (or reagent) is moved to the process chamber 250 via a force (e.g., centrifugal force), the first direction can be oriented generally along the direction of force, and the second direction can be oriented generally opposite the direction of force.

When the valve septum 236 is changed to the open configuration (e.g., by emitting electromagnetic energy at the septum 236), the vapor lock in the valve chamber 234 can be released, at least partly because of the equilibrium channel 255 connecting the downstream side of the septum 236 back up to the input chamber 265. The release of the vapor lock can allow fluid (e.g., liquid) to flow into the fluid pathway 228, into the valve chamber 234, and to the process chamber 250. In some embodiments, this phenomenon can be facilitated when the channels and chambers are hydrophobic, or generally defined by hydrophobic surfaces. That is, in some embodiments, the substrate 202 and any covers or layers 204, 205, and 208 (or adhesives coated thereon, for example, comprising silicone polyurea) that at least partially define the channel and chambers can be formed of hydrophobic materials or include hydrophobic surfaces. In some embodiments, fluid can flow into the fluid pathway 228 when a sufficient force has been exerted on the fluid (e.g., when a threshold force on the fluid has been achieved, e.g., when the rotation of the sample processing device 200 about the axis of rotation B-B has exceeded a threshold acceleration or rotational acceleration). After the fluid has overcome the capillary forces in the capillary valve 230, the fluid can flow through the open valve septum 236 to downstream fluid structures (e.g., the process chamber 250).

Moving sample material within sample processing devices that include unvented distribution systems may be facilitated by alternately accelerating and decelerating the device during rotation, essentially burping the sample materials through the various channels and chambers. The rotating may be performed using at least two acceleration/deceleration cycles, i.e., an initial acceleration, followed by deceleration, second round of acceleration, and second round of deceleration. Any of the loading processes or acceleration/deceleration schemes described with respect to FIG. 1 can also be employed in the sample processing device 200 of FIGS. 2-8.

As shown in FIGS. 6 and 7, the equilibrium channel 255 can be formed of a series of channels on the top surface 206 and/or the bottom surface 209 of the substrate 202, and one or more vias that extend between the top surface 206 and the bottom surface 209, which can aid in traversing stepped portions in the top surface 206 of the substrate 202. Specifically, as shown in FIG. 6, the illustrated equilibrium channel 255 includes a first channel or portion 256 that extends along the top surface 206 of an outermost step 213; a first via 257 extending from the top surface 206 to the bottom surface 209 to avoid the equilibrium channel 255 having to traverse the stepped portion of the top surface 206; and a second channel or portion 258 (see FIG. 7) that extends to a radially inward portion of the input chamber 265.

Air or another fluid within the process chamber 250 may be displaced when the process chamber 250 receives a sample material or other material. The equilibrium channel 255 may provide a path for the displaced air or other displaced fluid to pass out of the process chamber 250. The equilibrium channel 255 may assist in more efficient movement of fluid through the sample processing device 200 by equilibrating the pressure within each distribution system or processing array of the sample processing device 200 (e.g., the input chamber 215 and the process chamber 250, and the various channels connecting the input chamber 215 and the process chamber 250) by enabling some channels of the distribution system to be dedicated to the flow of a fluid in one direction (e.g., an upstream or downstream direction). In the embodiment illustrated in FIGS. 2-8, the sample generally flows downstream and radially outwardly (e.g., when the sample processing device 200 is rotated about the center 201) from the input chamber 215, through the capillary valve 230 and the septum valve 232, and through the distribution channel 240, to the process chamber 250. Other fluid (e.g., gases present in the process chamber 250) can generally flow upstream or radially inwardly (i.e., generally opposite that of the direction of sample movement) from the process chamber 250, through the equilibrium channel 255, to the input chamber 265.

Returning to the valving structure, the downstream side of the valve septum 236 (i.e., which faces the top surface 206 of the illustrated sample processing device 200; see FIGS. 6 and 8) faces and eventually opens into (e.g., after an opening or void is formed in the valve septum 236) a distribution channel 240 that fluidly couples the valve chamber 234 (and ultimately, the input chamber 215 and particularly, the metering reservoir 218) and the process chamber 250. Similar to the equilibrium channel 255, the distribution channel 240 can be formed of a series of channels on the top surface 206 and/or the bottom surface 209 of the substrate 202 and one or more vias that extend between the top surface 206 and the bottom surface 209, which can aid in traversing stepped portions in the top surface 206 of the substrate 202. For example, as shown in FIGS. 6-8, in some embodiments, the distribution channel 240 can include a first channel or portion 242 (see FIGS. 6 and 8) that extends along the top surface 206 of the middle step 213 of the substrate 202; a first via 244 (see FIGS. 6-8) that extends from the top surface 206 to the bottom surface 209; a second channel or portion 246 (see FIGS. 7 and 8) that extends along the bottom surface 209 to avoid traversing the stepped top surface 206; a second via 247 (see FIGS. 6-8) that extends from the bottom surface 209 to the top surface 206, and a third channel or portion 248 (see FIGS. 6 and 8) that extends along the top surface 206 and empties into the process chamber 250.

All layers and covers are removed from the sample processing device 200 in FIGS. 4-8 for simplicity, such that the substrate 202 alone is shown; however, it should be understood that any channels and chambers formed on the bottom surface 209 can also be at least partially defined by the second layer(s) 208, and that any channels and chambers formed on the top surface 206 can also be at least partially defined by the first layer(s) 204, as shown in FIGS. 2-3.

Force can be exerted on a sample to cause it to move from the input chamber 215 (i.e., the metering reservoir 218), through the fluid pathway 228, into the valve chamber 234, through a void in the valve septum 236, along the distribution channel 240, and into the process chamber 250. As mentioned above, such force can be centrifugal force that can be generated by rotating the sample processing device 200, for example, about the axis of rotation B-B, to move the sample radially outwardly from the axis of rotation B-B (i.e., because at least a portion of the process chamber 250 is located radially outwardly of the input chamber 215). However, such force can also be established by a pressure differential (e.g., positive and/or negative pressure), and/or gravitational force. Under an appropriate force, the sample can traverse through the various fluid structures, including the vias, to ultimately reside in the process chamber 250. Particularly, a selected volume, as controlled by the metering reservoir 218 (i.e., and baffles 216 and waste reservoir 220), of the sample will be moved to the process chamber 250 after the septum valve 232 is opened and a sufficient force is exerted on the sample to move the sample through the fluid pathway 228 of the capillary valve 230.

In the embodiment illustrated in FIGS. 2-8, the valve septum 236 is located between the valve chamber 234 and the detection (or process) chamber 250, and particularly, is located between the valve chamber 234 and the distribution channel 240 that leads to the process chamber 250. While the distribution channel 240 is shown by way of example only, it should be understood that in some embodiments, the valve chamber 234 may open directly into the process chamber 250, such that the valve septum 236 is positioned directly between the valve chamber 234 and the process chamber 250.

The reagent handling side 261 of the lane 203 can be configured substantially similarly as that of the sample handling side 211 of the lane 203. Therefore, any details, features or alternatives thereof of the features of the sample handling side 211 described above can be extended to the features of the reagent handling side 261. As shown in FIGS. 3, 5 and 7, the reagent handling side 261 includes the second input aperture 260 which opens into the input chamber or well 265. As shown, in some embodiments, the input chamber 265 can include one or more baffles or walls 266 or other suitable fluid directing structures that are positioned to divide the input chamber 265 into at least a metering portion, chamber, or reservoir 268 and a waste portion, chamber or reservoir 270. The baffles 266 can function to direct and/or contain fluid in the input chamber 265. As shown in the illustrated embodiment, a reagent can be loaded onto the sample processing device 200 into the same lane 203 as the corresponding sample via the input aperture 260. In some embodiments, the reagent can include a complete reagent cocktail or master mix that can be loaded at the desired time for a given assay. However, in some embodiments, the reagent can include multiple portions that are loaded at different times, as needed for a particular assay. Particular advantages have been noted where the reagent is in the form of an assay cocktail or master mix, such that all enzymes, fluorescent labels, probes, and the like, that are needed for a particular assay can be loaded (e.g., by a non-expert user) at once and subsequently metered and delivered (by the sample processing device 200) to the sample when appropriate.

After the reagent is loaded onto the sample processing device 200, the sample processing device 200 can be rotated about the axis of rotation B-B, directing (e.g., by the one or more baffles 266) the reagent to the metering reservoir 268. The metering reservoir 268 is configured to retain or hold a selected volume of a material, any excess being directed to the waste reservoir 270. In some embodiments, the input chamber 265, or a portion thereof, can be referred to as a "first chamber," a "first process chamber" and the process chamber 250 can be referred to as a "second chamber" or a "second process chamber."

As shown in FIG. 7, the metering reservoir 268 includes a first end 272 positioned toward the center 201 of the sample processing device 200 and the axis of rotation B-B, and a second end 274 positioned away from the center 201 and the axis of rotation B-B (i.e., radially outwardly of the first end 272), such that as the sample processing device 200 is rotated, the reagent is forced toward the second end 274 of the metering reservoir 268. The one or more baffles or walls 266 defining the second end 274 of the metering reservoir 268 can include a base 273 and a sidewall 276 (e.g., a partial sidewall) that are arranged to define a selected volume. The sidewall 276 is arranged and shaped to allow any volume in excess of the selected volume to overflow the sidewall 276 and run off into the waste reservoir 270. As a result, at least a portion of the waste reservoir 270 can be positioned radially outwardly of the metering reservoir 268 or of the remainder of the input chamber 265, to facilitate moving the excess volume of material into the waste reservoir 270 and inhibit the excess volume from moving back into the metering reservoir 268, as the sample processing device 200 is rotated.

In other words, with continued reference to FIG. 7, the input chamber 265 can include one or more first baffles 266A that are positioned to direct material from the input aperture 260 toward the metering reservoir 268, and one or more second baffles 266B that are positioned to contain fluid of a selected volume and/or direct fluid in excess of the selected volume into the waste reservoir 270.

As shown, the base 273 can include an opening or fluid pathway 278 formed therein that can be configured to form at least a portion of a capillary valve 280. The capillary valve 280 and metering reservoir 268 can function the same as the capillary valve 230 and the metering reservoir 218 of the sample handling side 211 of the lane 203. In addition, the fluid pathway 278 aspect ratios, and ranges thereof, can be the same as those described above with respect to the capillary valve 230.

As shown in FIGS. 3, 5 and 7, in some embodiments, the reagent metering reservoir 268 can be configured to retain a larger volume than the sample metering reservoir 218. As a result, a desired (and relatively smaller) volume of sample needed for a particular assay can be retained by the sample metering reservoir 218 and sent downstream (e.g., via the valving structure 230, 232 and distribution channel 240) to the process chamber 250 for processing, and a desired (and relatively larger) volume of the reagent needed for a particular assay (or a step thereof) can be retained by the reagent metering reservoir 268 and sent downstream to the process chamber 250 for processing via structures that will now be described.

Similar to the sample handling side 211, the capillary valve 280 on the reagent handling side 261 can be arranged in series with a septum valve 282. The septum valve 282 can include a valve chamber 284 and a valve septum 286. As described above with respect to the septum 236, the septum 286 can be located between the valve chamber 284 and one or more downstream fluid structures in the sample processing device 200, and the septum 286 can include a closed and an open configuration, and can prevent fluids (i.e., liquids) from moving between the valve chamber 284 and any downstream fluid structures when it is intact.

The valve septum 286 can include or be formed of any of the materials described above with respect to the valve septum 236, and can be configured and operated similarly. In some embodiments, the reagent valve septum 286 can be susceptible to a different wavelength or range of wavelengths of electromagnetic energy than the sample valve septum 236, but in some embodiments, the two valve septums 236 and 286 can be substantially the same and susceptible to the same electromagnetic energy, such that one energy source (e.g., a laser) can be used for opening all of the septum valves 230 and 280 on the sample processing device 200.

After an opening or void has been formed in the valve septum 286, the valve chamber 284 becomes in fluid communication with downstream fluid structures, such as the process chamber 250, via the void in the valve septum 286, wherein the reagent can be combined with the sample. After a reagent has been loaded into the reagent handling side 261 of the lane 203, the second input aperture 260 can be closed, sealed and/or plugged. As such, the sample processing device 200 can be sealed from ambience or "unvented" during processing.

In the embodiment illustrated in FIGS. 2-8, the same equilibrium channel 255 can facilitate fluid movement in a downstream direction in both the sample handling side 211 and the reagent handling side 261 to assist in moving both the sample and the reagent to the process chamber 250, which can occur simultaneously or at different times.

The downstream side of the valve septum 286 (i.e., which faces the top surface 206 of the illustrated sample processing device 200; see FIG. 6) faces and eventually opens into (e.g., after an opening or void is formed in the valve septum 236) a distribution channel 290 that fluidly couples the valve chamber 284 (and ultimately, the input chamber 265 and particularly, the metering reservoir 268) and the process chamber 250. Similar to the equilibrium channel 255 and the sample distribution channel 240, the distribution channel 290 can be formed of a series of channels on the top surface 206 and/or the bottom surface 209 of the substrate 202, and one or more vias that extend between the top surface 206 and the bottom surface 209, which can aid in traversing stepped portions in the top surface 206 of the substrate 202. For example, as shown in FIGS. 6 and 7, in some embodiments, the distribution channel 290 can include a first channel or portion 292 (see FIG. 6) that extends along the top surface 206 of the middle step 213 of the substrate 202; a first via 294 (see FIGS. 6 and 7) that extends from the top surface 206 to the bottom surface 209; a second channel or portion 296 (see FIG. 7) that extends along the bottom surface 209 to avoid traversing the stepped top surface 206; a second via 297 (see FIGS. 6 and 7) that extends from the bottom surface 209 to the top surface 206, and a third channel or portion 298 (see FIG. 6) that extends along the top surface 206 and empties into the process chamber 250.

Force can be exerted on a reagent to cause it to move from the input chamber 265 (i.e., the metering reservoir 268), through the fluid pathway 278, into the valve chamber 284, through a void in the valve septum 286, along the distribution channel 290, and into the process chamber 250, where the reagent and a sample can be combined. As mentioned above, such force can be centrifugal force that can be generated by rotating the sample processing device 200, for example, about the axis of rotation B-B, but such force can also be established by a pressure differential (e.g., positive and/or negative pressure), and/or gravitational force. Under an appropriate force, the reagent can traverse through the various fluid structures, including the vias, to ultimately reside in the process chamber 250. Particularly, a selected volume, as controlled by the metering reservoir 268 (i.e., and baffles 266 and waste reservoir 270), of the reagent will be moved to the process chamber 250 after the septum valve 282 is opened and a sufficient force is exerted on the reagent to move the reagent through the fluid pathway 278 of the capillary valve 280.

In the embodiment illustrated in FIGS. 2-8, the valve septum 286 is located between the valve chamber 284 and the detection (or process) chamber 250, and particularly, is located between the valve chamber 284 and the distribution channel 290 that leads to the process chamber 250. While the distribution channel 290 is shown by way of example only, it should be understood that in some embodiments, the valve chamber 284 may open directly into the process chamber 250, such that the valve septum 286 is positioned directly between the valve chamber 284 and the process chamber 250. In addition, in some embodiments, neither the sample distribution channel 240 nor the reagent distribution channel 290 is employed, or only one of the distribution channels 240, 290 is employed, rather than both, as illustrated in the embodiment of FIGS. 2-8.

The following process describes one exemplary method of processing a sample using the sample processing device 200 of FIGS. 2-8.

By way of example only, for the following process, the sample and the reagent will be both loaded onto the sample processing device 200 before the sample processing device 200 is positioned on or within a sample processing system or instrument, such as the systems described in co-pending U.S. Application No. 61/487,618, filed May 18, 2011. However, it should be understood that the sample and the reagent can instead be loaded onto the sample processing device 200 after a background scan of the process chambers 250 has been obtained.

The sample and the reagent can be loaded onto the sample processing device or "disk" 200 by removing the pre-use layer 205 over the lane 203 of interest and injecting (e.g., pipetting) the raw sample into the input chamber 215 via the input aperture 210 on the sample handling side 211 of the lane 203. The reagent can also be loaded at this time, so for this example, we will assume that the reagent is also loaded onto the disk 200 at this time by injecting the reagent into the input chamber 265 via the input aperture 260 on the reagent handling side 261 of the lane 203. A plug 207, or other appropriate seal, film, or cover, can then be used to seal the apertures 210, 260 from ambience, as described above. For example, in some embodiments, the pre-use layer 205 can simply be replaced over the input apertures 210, 260.

The disk 200 can then be caused to rotate about its center 201 and about the axis of rotation B-B. The disk 200 can be rotated at a first speed (or speed profile) and a first acceleration (or acceleration profile) sufficient to force the sample and the reagent into their respective metering reservoirs 218, 268, with any excess over the desired volumes being directed into the respective waste reservoirs 220, 270.

For example, in some embodiments, a first speed profile may include the following: the disk 200 is (i) rotated at a first speed to move the materials to their respective metering reservoirs 218, 268 without forcing all of the material directly into the waste reservoirs 220, 270, (ii) held for a period of time (e.g., 3 seconds), and (iii) rotated at a second speed to cause any amount of material greater than the volume of the metering reservoir 218, 268 to overflow into the waste reservoir 220, 270. Such a rotation scheme can be referred to as a "metering profile," "metering scheme," or the like, because it allows the materials to be moved into the respective metering reservoirs 218, 268 while ensuring that the materials are not forced entirely into the waste reservoirs 220, 270. In such an example, the speed and acceleration are kept below a speed and acceleration that would cause the sample and/or reagent to move into the respective fluid pathway 228, 278 and "wet out" the valve septum 236, 286. Because the speed and acceleration profiles will be sufficient to meter the sample and the reagent while remaining below what might cause wetting out of the septums 236, 286, it can simply be described as a "first" speed and acceleration. That is, the first speed and acceleration is insufficient to force the sample or the reagent into the respective fluid pathways 228, 278, such that the metered volumes of the sample and the reagent remain in their respective input chamber 215, 265.

The disk 200 can be allowed to continue rotating for any initial or background scans that may be needed for a particular assay or to validate the system. Additional details regarding such detection and validation systems can be found in U.S. Application No. 61/487,618, filed May 18, 2011.

The disk 200 can then be stopped from rotating and one or both of the sample septum valve 232 and the reagent septum valve 282 can be opened, for example, by forming a void in the valve septum(s) 236, 286. Such a void can be formed by directing electromagnetic energy at the top surface of each septum 236, 286, for example, using a laser valve control system and method, as described in U.S. Pat. Nos. 7,709,249, 7,507,575, 7,527,763 and 7,867,767. For the sake of this example, we will assume that the sample is moved to the process chamber 250 first, and therefore, the sample valve septum 236 is opened first. The sample valve septum 236 can be located and opened to put the input chamber 215 and the process chamber 250 in fluid communication via a downstream direction.

The disk 200 can then be rotated at a second speed (or speed profile) and the first acceleration (or acceleration profile) sufficient to move the sample into the fluid pathway 228 (i.e., sufficient to open the capillary valve 230 and allow the sample to move therethrough), through the opening formed in the septum 236, through the distribution channel 240, and into the process chamber 250. Meanwhile, any fluid (e.g., gas) present in the process chamber 250 can be displaced into the equilibrium channel 255 as the sample is moved into the process chamber 250. This rotation speed and acceleration can be sufficient to move the sample to the detection chamber 250 but not sufficient to cause the reagent to move into the fluid pathway 278 of the capillary valve 280 and wet out the septum 286.

The disk 200 can then be rotated and heated. Such a heating step can cause lysis of cells in the sample, for example. In some embodiments, it is important that the reagent not be present in the process chamber 250 for this heating step, because temperatures required for thermal cell lysis may denature necessary enzymes (e.g., reverse transcriptase) present in the reagent. Thermal cell lysis is described by way of example only, however, it should be understood that other (e.g., chemical) lysis protocols can be used instead.

The disk 200 can then be stopped from rotating and the reagent septum valve 282 can be opened. The reagent septum valve 282 can be opened by the same method as that of the sample septum valve 232 to form a void in the reagent valve septum 286 to put the input chamber 265 in fluid communication with the process chamber 250 via a downstream direction.

The disk 200 can then be rotated at the second speed (or speed profile) and the second acceleration (or acceleration profile), or higher, to transfer the reagent to the process chamber 250. Namely, the rotation speed and acceleration can be sufficient to move the reagent into the fluid pathway 278 (i.e., sufficient to open the capillary valve 280 and allow the reagent to move therethrough), through the opening formed in the septum 286, through the distribution channel 290, and into the detection chamber 250. Meanwhile, any additional fluid (e.g., gas) present in the process chamber 250 can be displaced into the equilibrium channel 255 as the reagent is moved into the process chamber 250. This is particularly enabled by embodiments such as the disk 200, because when the disk 200 is rotating, any liquid present in the process chamber 250 (e.g., the sample) is forced against an outermost 252 (see FIG. 6), such that any liquid present in the process chamber 250 will be located radially outwardly of the locations at which the distribution channel 290 and the equilibrium channel 255 connect to the process chamber 250, so that gas exchange can occur. Said another way, when the disk 200 is rotating, the distribution channel 290 and the equilibrium channel 255 connect to the process chamber 250 at a location that is upstream (e.g., radially inwardly) of the fluid level in the detection chamber 250. For example, the distribution channel 290 and the equilibrium channel 255 connect adjacent an innermost end 251 of the process chamber 250.

The rotating of the disk 200 can then be continued as needed for a desired reaction and detection scheme. For example, now that the reagent is present in the process chamber 250, the process chamber 250 can be heated to a temperature necessary to begin reverse transcription (e.g., 47° C.). Additional thermal cycling can be employed as needed, such as heating and cooling cycles necessary for PCR, etc.

It should be noted that the process described above can be employed in one lane 203 at a time on the disk 200, or one or more lanes can be loaded and processed simultaneously according to this process.

While various embodiments of the present disclosure are shown in the accompanying drawings by way of example only, it should be understood that a variety of combinations of the embodiments described and illustrated herein can be employed without departing from the scope of the present disclosure. For example, each lane 203 of the sample processing device 200 is shown as including essentially two of the processing arrays 100 of FIG. 1; however, it should be understood that the sample processing device 200 is shown by way of example only and is not intended to be limiting. Thus, each lane 203 can instead include fewer or more than two processing arrays 100, as needed for a particular application. In addition, each metering reservoir 118, 218, 268 is illustrated as being in fluid communication with a capillary valve 130, 230, 280 that is further in fluid communication with a septum valve 132, 232, 282. However, it should be understood that in some embodiments, the metering reservoir 118, 218, 268 may be in fluid communication only with a capillary valve 130, 230, 280, such that when the capillary forces are overcome, the selected volume of material is allowed to move from a downstream end of the capillary valve 130, 230, 280 to the process chamber 250. Furthermore, each processing array 100, 211, 261 is illustrated as including one input chamber 115, 215, 265 and one process chamber 150, 250, 250; however, it should be understood that as many chambers and fluid structures as necessary can be employed intermediately between the input chamber 115, 215, 265 and the process chamber 150, 250. As a result, the present disclosure should be taken as a whole for all of the various features, elements, and alternatives to those features and elements described herein, as well as the possible combinations of such features and elements.

The following embodiments of the present disclosure are intended to be illustrative and not limiting.

EMBODIMENTS

Embodiment 1 is a metering structure on a sample processing device, the sample processing device configured to be rotated about an axis of rotation, the metering structure comprising:

- a metering reservoir configured to hold a selected volume of liquid, the metering reservoir including a first end and a second end positioned radially outwardly of the first end, relative to the axis of rotation;
- a waste reservoir positioned in fluid communication with the first end of the metering reservoir and configured to catch excess liquid from the metering reservoir when the selected volume of the metering reservoir is exceeded, wherein at least a portion of the waste reservoir is positioned radially outwardly of the metering reservoir, relative to the axis of rotation; and a capillary valve in fluid communication with the second end of the metering reservoir, wherein the capillary valve is positioned radially outwardly of at least a portion of the metering reservoir, relative to the axis of rotation, and is configured to inhibit liquid from exiting the metering reservoir until desired;

wherein the metering structure is unvented, such that the metering structure is not in fluid communication with ambience.

Embodiment 2 is the metering structure of embodiment 1, wherein the metering reservoir and the waste reservoir each form a portion of an input chamber of the sample processing device, and wherein the metering reservoir and the waste reservoir are separated by at least one baffle.

Embodiment 3 is the metering structure of embodiment 2, further comprising a process chamber positioned to be in fluid communication with the input chamber and configured to receive the selected volume of fluid from the metering reservoir via the capillary valve.

Embodiment 4 is the metering structure of embodiment 3, wherein the process chamber defines a volume for containing the liquid and comprising a fluid, and further comprising an equilibrium channel positioned to fluidly couple the process chamber with the input chamber in such a way that fluid can flow from the process chamber to the input chamber through the equilibrium channel without reentering the capillary valve, wherein the channel is positioned to provide a path for fluid to exit the process chamber when the liquid enters the process chamber and displaces at least a portion of the fluid.

Embodiment 5 is the metering structure of embodiment 3, further comprising an equilibrium channel positioned in fluid communication between the process chamber and the input chamber to provide an additional path for fluid to exit the process chamber when the liquid enters the process chamber and displaces at least a portion of the fluid.

Embodiment 6 is the metering structure of any of embodiments 1-5, wherein the metering reservoir includes a base and a partial sidewall arranged to define the selected volume, and wherein the waste reservoir is positioned to catch excess liquid that spills over the partial sidewall when the selected volume of the metering reservoir has been exceeded.

Embodiment 7 is the metering structure of any of embodiments 1, 2 and 6, further comprising a process chamber positioned to be in fluid communication with the second end of the metering reservoir and configured to receive the selected volume of liquid from the metering reservoir via the capillary valve.

Embodiment 8 is the metering structure of any of embodiments 1-7, wherein the capillary valve includes an inlet coupled to the metering reservoir, and an outlet, and further comprising an additional chamber coupled to the outlet of the capillary valve.

Embodiment 9 is the metering structure of any of embodiments 1-8, further comprising a septum valve in fluid communication with an outlet of the capillary valve.

Embodiment 10 is the metering structure of any of embodiments 1-8, further comprising:

a valve chamber in fluid communication with an outlet of the capillary valve;

a process chamber positioned to be in fluid communication with an outlet of the valve chamber; and a valve septum located between the valve chamber and the process chamber, the valve septum having:

a closed configuration wherein the valve chamber and the process chamber are not in fluid communication, and an open configuration wherein the valve chamber and the process chamber are in fluid communication.

Embodiment 11 is the metering structure of embodiment 10, wherein the capillary valve is configured to inhibit the liquid from wicking out of the metering reservoir by capillary flow and collecting adjacent the valve septum when the valve septum is in the closed configuration.

Embodiment 12 is the metering structure of embodiment 10 or 11, wherein the liquid is inhibited from exiting the metering reservoir when the valve septum is in the closed configuration by at least one of:

the dimensions of the fluid pathway, the surface energy of the fluid pathway, the surface tension of the liquid, and any gas present in the valve chamber.

Embodiment 13 is the metering structure of any of embodiments 10-12, wherein the valve chamber, the capillary valve, and the valve septum are configured such that the valve chamber provides a vapor lock when the valve septum is in the closed configuration.

Embodiment 14 is a processing array on a sample processing device, the sample processing device configured to be rotated about an axis of rotation, the processing array comprising:

an input chamber comprising a metering reservoir configured to hold a selected volume of liquid, the metering reservoir including a first end and a second end positioned radially outwardly of the first end, relative to the axis of rotation, a waste reservoir positioned in fluid communication with the first end of the metering reservoir and configured to catch excess liquid from the metering reservoir when the selected volume of the metering reservoir is exceeded, wherein at least a portion of the waste reservoir is positioned radially outwardly of the metering reservoir, relative to the axis of rotation, and a baffle positioned to at least partially define the selected volume of the metering reservoir and to separate the metering reservoir and the waste reservoir;

a capillary valve positioned in fluid communication with the second end of the metering reservoir of the input chamber, wherein the capillary valve is positioned radially outwardly of at least a portion of the metering reservoir, relative to the axis of rotation, and is configured to inhibit liquid from exiting the metering reservoir until desired; and a process chamber positioned to be in fluid communication with the input chamber and configured to receive the selected volume of fluid from the metering reservoir via the capillary valve.

Embodiment 15 is the processing array of embodiment 14, wherein the processing array is unvented, such that the processing array is not in fluid communication with ambience.

Embodiment 16 is the processing array of embodiment 14 or 15, wherein the baffle is a first baffle, and further comprising at least one second baffle positioned to direct liquid into the metering reservoir of the input chamber.

Embodiment 17 is the processing array of any of embodiments 14-16, wherein the process chamber defines a volume for containing the liquid and comprising a fluid, and further comprising an equilibrium channel positioned to fluidly couple the process chamber with the input chamber in such a way that fluid can flow from the process chamber to the input chamber through the equilibrium channel without reentering the capillary valve, wherein the channel is positioned to provide a path for fluid to exit the process chamber when the liquid enters the process chamber and displaces at least a portion of the fluid.

Embodiment 18 is the processing array of any of embodiments 14-16, further comprising an equilibrium channel positioned in fluid communication between the process chamber and the input chamber to provide an additional path for fluid to exit the process chamber when the liquid enters the process chamber and displaces at least a portion of the fluid.

Embodiment 19 is the processing array of any of embodiments 14-18, further comprising a septum valve positioned between the capillary valve and the process chamber.

Embodiment 20 is the processing array of any of embodiments 14-18, further comprising:

- a valve chamber positioned between the capillary valve and the process chamber;
- a valve septum located between the valve chamber and the process chamber, the valve septum having:
  - a closed configuration wherein the valve chamber and the process chamber are not in fluid communication, and
  - an open configuration wherein the valve chamber and the process chamber are in fluid communication.

Embodiment 21 is the processing array of embodiment 20, wherein the capillary valve is configured to inhibit the liquid from wicking out of the metering reservoir by capillary flow and collecting adjacent the valve septum when the valve septum is in the closed configuration.

Embodiment 22 is the processing array of embodiment 20 or 21, wherein the liquid is inhibited from exiting the metering reservoir when the valve septum is in the closed configuration by at least one of:

- the dimensions of the fluid pathway,
- the surface energy of the fluid pathway,
- the surface tension of the liquid, and
- any gas present in the valve chamber.

Embodiment 23 is the processing array of any of embodiments 20-22, wherein the valve chamber, the capillary valve, and the valve septum are configured such that the valve chamber provides a vapor lock when the valve septum is in the closed configuration.

Embodiment 24 is a method for volumetric metering on a sample processing device, the method comprising:

- providing a sample processing device configured to be rotated about an axis of rotation and comprising a processing array comprising
  - a metering reservoir configured to hold a selected volume of liquid, the metering reservoir including a first end and a second end positioned radially outwardly of the first end, relative to the axis of rotation;
  - a waste reservoir positioned in fluid communication with the first end of the metering reservoir and configured to catch excess liquid from the metering reservoir when the selected volume of the metering reservoir is exceeded, wherein at least a portion of the waste reservoir is positioned radially outwardly of the metering reservoir, relative to the axis of rotation; and
  - a capillary valve in fluid communication with the second end of the metering reservoir, wherein the capillary valve is positioned radially outwardly of at least a portion of the metering reservoir, relative to the axis of rotation, and is configured to inhibit liquid from exiting the metering reservoir until desired, and
  - a process chamber positioned to be in fluid communication with the metering reservoir via the capillary valve;
- positioning a liquid in the processing array of the sample processing device;
- metering the liquid by rotating the sample processing device about the axis of rotation to exert a first force on the liquid such that the selected volume of the liquid is contained in the metering reservoir and any additional volume of the liquid is moved into the waste reservoir but not the capillary valve; and
- after the liquid is metered, moving the selected volume of the liquid to the process chamber via the capillary valve by rotating the sample processing device about the axis of rotation to exert a second force on the liquid that is greater than the first force.

Embodiment 25 is the method of embodiment 24, wherein the sample processing device further comprises:

- a valve chamber positioned between the capillary valve and the process chamber; and
- a valve septum located between the valve chamber and the process chamber, the valve septum having:
  - a closed configuration wherein the valve chamber and the process chamber are not in fluid communication, and
  - an open configuration wherein the valve chamber and the process chamber are in fluid communication.

Embodiment 26 is the method of embodiment 25, further comprising forming an opening in the valve septum prior to moving the selected volume of the sample to the process chamber.

Embodiment 27 is the method of embodiment 25 or 26, wherein the valve chamber, the capillary valve, and the valve septum are configured such that the valve chamber provides a vapor lock when the valve septum is in the closed configuration.

Embodiment 28 is the method of any of embodiments 24-27, further comprising internally venting the processing array as the selected volume of the liquid is moved to the process chamber.

Embodiment 29 is the method of any of embodiments 24-28, wherein the process chamber defines a volume for containing the liquid and comprising a fluid, and further comprising an equilibrium channel positioned to fluidly couple the process chamber with the input chamber in such a way that fluid can flow from the process chamber to the input chamber through the equilibrium channel without reentering the capillary valve, wherein the channel is positioned to provide a path for fluid to exit the process chamber when the liquid enters the process chamber and displaces at least a portion of the fluid.

Embodiment 30 is the method of any of embodiments 24-29, further comprising an equilibrium channel positioned in fluid communication between the process chamber and the input chamber to provide an additional path for fluid to exit the process chamber when the liquid enters the process chamber and displaces at least a portion of the fluid.

Embodiment 31 is the metering structure of any of embodiments 1-13, the processing array of any of embodiments 14-23, or the method of any of embodiments 24-30, wherein the liquid is an aqueous liquid.

Embodiment 32 is the metering structure of any of embodiments 1-13 and 31, the processing array of any of embodiments 14-23 and 31, or the method of any of embodiments 24-31, wherein the capillary valve is configured to inhibit liquid from exiting the metering reservoir until at least one of a force exerted on the liquid, the surface tension of the liquid, and the surface energy of the capillary valve is sufficient to move the liquid past the capillary valve.

Embodiment 33 is the metering structure of any of embodiments 1-13 and 31-32, the processing array of any of embodiments 14-23 and 31-32, or the method of any of embodiments 24-32, wherein the capillary valve includes a fluid pathway having a constriction that is dimensioned to inhibit the liquid from wicking out of the metering reservoir by capillary flow.

Embodiment 34 is the metering structure, the processing array, or the method of embodiment 33, wherein the constriction is dimensioned to inhibit liquid from exiting the metering reservoir until at least one of a force exerted on the liquid, the surface tension of the liquid, and the surface energy of the constriction is sufficient to move the liquid past the constriction.

Embodiment 35 is the metering structure, the processing array, or the method of embodiment 33 or 34, wherein the constriction is dimensioned to inhibit liquid from exiting the metering reservoir until the sample processing device is rotated and a centrifugal force is reached that is sufficient to cause the liquid to exit the metering reservoir.

Embodiment 36 is the metering structure, the processing array, or the method of any of embodiments 33-35, wherein the constriction is located directly adjacent the second end of the metering reservoir.

The following working examples are intended to be illustrative of the present disclosure and not limiting.

EXAMPLES

Materials

Sample: Copan Universal Transport Medium (UTM) for Viruses, Chlamydia, Mycoplasma, and Ureaplasma, 3.0 mL tube, part number 330C, lot 39P505 (Copan Diagnostics, Murrietta, Ga.).

Reagent master mix: Applied Biosystems (Foster City, Calif.) 10×PCR buffer, P/N 4376230, lot number 1006020, diluted to 1× with nuclease-free water.

Equipment:

A "Moderate Complexity Disk," described above and shown in FIGS. 2-8, available as Product No. 3958 from 3M Company of St. Paul, Minn., was used as the sample processing device or "disk" in this example.

An Integrated Cycler Model 3954, available from 3M Company of St. Paul, Minn., was used as the sample processing system or "instrument" in this example.

Example 1

The following experiment was performed to determine the ability of the disk to meter 10 μL of sample from input volumes of various amounts from 20 μL-100 μL.

Example 1

Procedure—Sample Metering Protocol

1. Added X amount of UTM sample into the sample input aperture of the disk, where X varied from 20-100 μL, according to the multiple disks and samples described in Table 1.
2. Positioned the loaded disk onto the instrument.
3. Metered 10 μL sample into the metering reservoir by the following procedure: the disk was rotated at 525 rpm with an acceleration of 24.4 revolutions/sec$^2$, held for 5 seconds, then rotated at 975 rpm with an acceleration of 24.4 revolutions/sec$^2$, and held for 5 seconds. 10 μL of sample was retained in the sample metering reservoir. The remainder overflowed to waste reservoirs.
4. Performed laser homing (i.e., according to the process described in co-pending U.S. Application No. 61/487,618, filed May 18, 2011, and shown in FIG. 14 of same co-pending application). The laser used was a high power density laser diode, part number SLD323V, available from Sony Corporation, Tokyo, Japan.
5. Stopped rotation of disk, and opened sample valves with one laser pulse at 2 seconds at 800 milliwatts (mW), according to the process described in co-pending U.S. Application No. 61/487,618, filed May 18, 2011, and shown in FIG. 12 of same co-pending application.
6. Transferred the 10 μL of sample to process chambers by rotating the disk at 1800 rpm with an acceleration of 24.4 revolutions/sec$^2$, and held for 10 seconds.
7. The disk was stopped and removed from the instrument.
8. The sample volumes were removed from the detection chamber using a syringe needle. The entire contents of the well were transferred to a tared weigh boat and weighed using a calibrated analytical balance.
9. Using the known density of the UTM, the volume of UTM metered into the detection chamber was calculated. Results are shown in Table 1.

TABLE 1

Sample Metering Results

| Number of disks tested | UTM input volume (μL) | Number of samples (8 per disk) | Average Calculated Volume (μL) | Std Dev |
|---|---|---|---|---|
| 2 | 20 | 16 | 10.97 | 0.77 |
| 2 | 40 | 16 | 10.02 | 0.84 |
| 10 | 50 | 80 | 10.16 | 0.94 |
| 2 | 60 | 16 | 9.88 | 0.81 |
| 2 | 75 | 16 | 9.97 | 0.96 |
| 2 | 90 | 16 | 9.95 | 0.96 |
| 2 | 100 | 16 | 10.18 | 0.87 |
| OVERALL: | | | | |
| 22 | — | 176 | 10.16 | 0.93 |

Example 2

Example 2 was performed with the same equipment as Example 1. However, instead of UTM sample, the master mix reagent was used to determine the ability of the disk to meter 40 μL of master mix reagent from starting input volume greater than 40 μL.

Example 2

Procedure—Reagent Metering Protocol

1. Added 50 μL of the master mix reagent into the reagent input aperture of each of the 8 lanes per disk. There were 5 disks used, each having 8 lanes, for a total of 40 samples.
2. Positioned the loaded disk onto the instrument.
3. Metered 40 μL reagent into the metering reservoir by the following procedure: the disk was rotated at 525 rpm with an acceleration of 24.4 revolutions/sec$^2$, held for 5 seconds, then rotated at 975 rpm with an acceleration of 24.4 revolutions/sec$^2$, and held for 5 seconds. 40 μL of sample was retained in the reagent metering reservoir. The remainder overflowed to the waste reservoir.
4. Performed laser homing (i.e., according to the process described in co-pending U.S. Application No. 61/487,618, filed May 18, 2011, and shown in FIG. 14 of same co-pending application). The laser used was a high power density laser diode, part number SLD323V, available from Sony Corporation, Tokyo, Japan.

5. Stopped rotation of disk, and opened reagent valves with one laser pulse at 2 seconds at 800 mW, according to the process described in co-pending U.S. Application No. 61/487,618, filed May 18, 2011, and shown in FIG. 12 of same co-pending application.
6. Transferred the 40 μL of reagent to process chambers by rotating the disk at 1800 rpm with an acceleration of 24.4 revolutions/sec$^2$, and held for 10 seconds.
7. The disk was stopped and removed from the instrument.
8. The sample volumes were removed from the detection chamber using a syringe needle. The entire contents of the well were transferred to a tared weigh boat and weighed using a calibrated analytical balance.
9. Using the known density of the master mix reagent, the volume of reagent metered into the detection chamber was calculated. The results for the 5 disks, each with 8 reagent lanes (n=40) were an average of 38.9 μL (Std Dev 0.33) of reagent metered into the process chamber after an initial volume of 50 μL of reagent loaded into each reagent aperture.

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure.

All references and publications cited herein are expressly incorporated herein by reference in their entirety into this disclosure.

Various features and aspects of the present disclosure are set forth in the following claims.

What is claimed is:

1. A metering structure on a sample processing device, the sample processing device configured to be rotated about an axis of rotation, the metering structure comprising:

a metering reservoir configured to hold a selected volume of liquid, the metering reservoir including a first end and a second end positioned radially outwardly of the first end, relative to the axis of rotation;

a waste reservoir positioned in fluid communication with the first end of the metering reservoir and configured to catch excess liquid from the metering reservoir when the selected volume of the metering reservoir is exceeded, wherein at least a portion of the waste reservoir is positioned radially outwardly of the metering reservoir, relative to the axis of rotation; and a capillary valve in fluid communication with the second end of the metering reservoir, wherein the capillary valve is positioned radially outwardly of at least a portion of the metering reservoir, relative to the axis of rotation, and is configured to inhibit liquid from exiting the metering reservoir until desired;

a valve chamber in fluid communication with an outlet of the capillary valve;

a process chamber positioned to be in fluid communication with an outlet of the valve chamber; and a valve septum located between the valve chamber and the process chamber, the valve septum having:

a closed configuration wherein the valve chamber and the process chamber are not in fluid communication, and an open configuration wherein the valve chamber and the process chamber are in fluid communication;

wherein the valve chamber, the capillary valve, and the valve septum are configured such that the valve chamber provides a vapor lock when the valve septum is in the closed configuration.

2. The metering structure of claim 1, wherein the metering reservoir and the waste reservoir each form a portion of an input chamber of the sample processing device, and wherein the metering reservoir and the waste reservoir are separated by at least one baffle.

3. The metering structure of claim 2, wherein the process chamber is positioned to be in fluid communication with the input chamber and configured to receive the selected volume of liquid from the metering reservoir via the capillary valve.

4. The metering structure of claim 3, wherein the process chamber defines a volume for containing the liquid and comprising a fluid, and further comprising an equilibrium channel positioned to fluidly couple the process chamber with the input chamber in such a way that fluid can flow from the process chamber to the input chamber through the equilibrium channel without reentering the capillary valve, wherein the channel is positioned to provide a path for fluid to exit the process chamber when the liquid enters the process chamber and displaces at least a portion of the fluid.

5. The metering structure of claim 3, further comprising an equilibrium channel positioned in fluid communication between the process chamber and the input chamber to provide an additional path for fluid to exit the process chamber when the liquid enters the process chamber and displaces at least a portion of the fluid.

6. The metering structure of claim 1, wherein the metering reservoir includes a base and a partial sidewall arranged to define the selected volume, and wherein the waste reservoir is positioned to catch excess liquid that spills over the partial sidewall when the selected volume of the metering reservoir has been exceeded.

7. The metering structure of claim 1, wherein the process chamber is positioned to be in fluid communication with the second end of the metering reservoir and configured to receive the selected volume of liquid from the metering reservoir via the capillary valve.

8. The metering structure of claim 1, wherein the capillary valve is configured to inhibit the liquid from wicking out of the metering reservoir by capillary flow and collecting adjacent the valve septum when the valve septum is in the closed configuration.

9. The metering structure of claim 1, wherein the liquid is inhibited from exiting the metering reservoir when the valve septum is in the closed configuration by at least one of:

the dimensions of the fluid pathway, the surface energy of the fluid pathway, the surface tension of the liquid, and any gas present in the valve chamber.

10. The metering structure of claim 1, wherein the capillary valve is configured to inhibit liquid from exiting the metering reservoir until at least one of a force exerted on the liquid, the surface tension of the liquid, and the surface energy of the capillary valve is sufficient to move the liquid past the capillary valve.

11. The metering structure claim 1, wherein the capillary valve includes a fluid pathway having a constriction that is dimensioned to inhibit the liquid from wicking out of the metering reservoir by capillary flow.

12. The metering structure of claim 11, wherein the constriction is dimensioned to inhibit liquid from exiting the metering reservoir until at least one of a force exerted on the liquid, the surface tension of the liquid, and the surface energy of the constriction is sufficient to move the liquid past the constriction.

13. The metering structure of claim 11, wherein the constriction is dimensioned to inhibit liquid from exiting the metering reservoir until the sample processing device is rotated and a centrifugal force is reached that is sufficient to cause the liquid to exit the metering reservoir.

14. The metering structure of claim 11, wherein the constriction is located directly adjacent the second end of the metering reservoir.

15. The metering structure of claim 1, wherein the metering structure is unvented, such that the metering structure is not in fluid communication with ambience.

16. The metering structure of claim 1, wherein the valve septum includes a first side and a second side opposite the first side, wherein an opening or void is formed in the valve septum in the open configuration, wherein the valve septum is configured to be changed from the closed configuration to the open configuration by directing electromagnetic energy at the first side of the valve septum, and wherein the capillary valve is configured to inhibit a liquid from entering the valve chamber and collecting adjacent the second side of the valve septum when the valve septum is in the closed configuration.

17. A method for volumetric metering on a sample processing device, the method comprising:

providing a sample processing device configured to be rotated about an axis of rotation and comprising a processing array comprising a metering reservoir configured to hold a selected volume of liquid, the metering reservoir including a first end and a second end positioned radially outwardly of the first end, relative to the axis of rotation;

a waste reservoir positioned in fluid communication with the first end of the metering reservoir and configured to catch excess liquid from the metering reservoir when the selected volume of the metering reservoir is exceeded, wherein at least a portion of the waste reservoir is positioned radially outwardly of the metering reservoir, relative to the axis of rotation; and a capillary valve in fluid communication with the second end of the metering reservoir, wherein the capillary valve is positioned radially outwardly of at least a portion of the metering reservoir, relative to the axis of rotation, and is configured to inhibit liquid from exiting the metering reservoir until desired, a process chamber positioned to be in fluid communication with the metering reservoir via the capillary valve, a valve chamber positioned between the capillary valve and the process chamber, and a valve septum located between the valve chamber and the process chamber, the valve septum having:

a closed configuration wherein the valve chamber and the process chamber are not in fluid communication, and an open configuration wherein the valve chamber and the process chamber are in fluid communication, wherein the valve chamber, the capillary valve, and the valve septum are configured such that the valve chamber provides a vapor lock when the valve septum is in the closed configuration;

positioning a liquid in the processing array of the sample processing device;

metering the liquid by rotating the sample processing device about the axis of rotation to exert a first force on the liquid such that the selected volume of the liquid is contained in the metering reservoir and any additional volume of the liquid is moved into the waste reservoir but not the capillary valve; and after the liquid is metered, moving the selected volume of the liquid to the process chamber via the capillary valve and the valve chamber by rotating the sample processing device about the axis of rotation to exert a second force on the liquid that is greater than the first force.

18. The method of claim 17, further comprising forming an opening in the valve septum prior to moving the selected volume of liquid to the process chamber.

19. The method of claim 17, further comprising internally venting the processing array as the selected volume of the liquid is moved to the process chamber.

20. The method of claim 17, wherein the process chamber defines a volume for containing the liquid and comprising a fluid, and further comprising an equilibrium channel positioned to fluidly couple the process chamber with an input chamber in such a way that fluid can flow from the process chamber to the input chamber through the equilibrium channel without reentering the capillary valve, wherein the channel is positioned to provide a path for fluid to exit the process chamber when the liquid enters the process chamber and displaces at least a portion of the fluid.

21. The method of claim 17, further comprising an equilibrium channel positioned in fluid communication between the process chamber and an input chamber to provide an additional path for fluid to exit the process chamber when the liquid enters the process chamber and displaces at least a portion of the fluid.

22. The method of claim 17, wherein the valve septum includes a first side and a second side opposite the first side, wherein the capillary valve is configured to inhibit the liquid from entering the valve chamber and collecting adjacent the second side of the valve septum when the valve septum is in the closed configuration, and further comprising directing electromagnetic energy at the first side of the valve septum to form an opening or void in the valve septum to change the valve septum from the closed configuration to the open configuration.

23. A processing array on a sample processing device, the processing array comprising:

a metering reservoir configured to hold a selected volume of liquid, the metering reservoir including a first end and a second end positioned radially outwardly of the first end, relative to the axis of rotation;

a waste reservoir positioned in fluid communication with the first end of the metering reservoir and configured to catch excess liquid from the metering reservoir when the selected volume of the metering reservoir is exceeded, wherein at least a portion of the waste reservoir is positioned radially outwardly of the metering reservoir, relative to the axis of rotation;

a capillary valve in fluid communication with the second end of the metering reservoir, wherein the capillary valve is positioned radially outwardly of at least a portion of the metering reservoir, relative to the axis of rotation, and is configured to inhibit liquid from exiting the metering reservoir until desired;

a valve chamber in fluid communication with an outlet of the capillary valve;

a process chamber positioned to be in fluid communication with an outlet of the valve chamber; and a valve septum located between the valve chamber and the process chamber, the valve septum having:

a first side, a second side opposite the first side, a closed configuration wherein the valve chamber and the process chamber are not in fluid communication, and an open configuration in which an opening or void is formed in the valve septum and the valve chamber and the process chamber are in fluid communication;

wherein the valve septum is configured to be changed from the closed configuration to the open configuration by directing electromagnetic energy at the first side of the valve septum, and wherein the capillary valve is configured to inhibit a liquid from entering the valve chamber and collecting adjacent the second side of the valve septum when the valve septum is in the closed configuration.

24. A method for processing a sample on a sample processing device, the method comprising:

providing a sample processing device configured to be rotated about an axis of rotation and comprising a processing array comprising:

a metering reservoir configured to hold a selected volume of liquid, the metering reservoir including a first end and a second end positioned radially outwardly of the first end, relative to the axis of rotation;

a waste reservoir positioned in fluid communication with the first end of the metering reservoir and configured to catch excess liquid from the metering reservoir when the selected volume of the metering reservoir is exceeded, wherein at least a portion of the waste reservoir is positioned radially outwardly of the metering reservoir, relative to the axis of rotation;

a capillary valve in fluid communication with the second end of the metering reservoir, wherein the capillary valve is positioned radially outwardly of at least a portion of the metering reservoir, relative to the axis of rotation, and is configured to inhibit liquid from exiting the metering reservoir until desired;

a process chamber positioned to be in fluid communication with the metering reservoir via the capillary valve;

a valve chamber positioned between the capillary valve and the process chamber; and a valve septum located between the valve chamber and the process chamber, the valve septum having:

a first side, a second side opposite the first side, a closed configuration wherein the valve chamber and the process chamber are not in fluid communication, and an open configuration in which an opening or void is formed in the valve septum and the valve chamber and the process chamber are in fluid communication, wherein the capillary valve is configured to inhibit a liquid from entering the valve chamber and collecting adjacent the second side of the valve septum when the valve septum is in the closed configuration;

positioning a liquid in the processing array of the sample processing device;

metering the liquid by rotating the sample processing device about the axis of rotation to exert a first force on the liquid such that the selected volume of the liquid is contained in the metering reservoir and any additional volume of the liquid is moved into the waste reservoir but not the capillary valve;

after the liquid is metered, directing electromagnetic energy at the first side of the valve septum to form an opening or void in the valve septum to change the valve septum from the closed configuration to the open configuration; and moving the selected volume of the liquid from the metering reservoir to the process chamber by rotating the sample processing device about the axis of rotation to exert a second force on the liquid that is greater than the first force.

* * * * *

UNITED STATES PATENT AND TRADEMARK OFFICE

CERTIFICATE OF CORRECTION

PATENT NO. : 8,931,331 B2
APPLICATION NO. : 13/474873
DATED : January 13, 2015
INVENTOR(S) : Peter Ludowise It is certified that error appears in the above-identified patent and that said Letters Patent is hereby corrected as shown below:

In the specification

Column 5
Line 64-65, Delete "application No. 29/384,821," and insert -- No. D667561, --, therefor.

Column 9
Line 20-23, Delete "in co-pending U.S. Patent Application No. 61/487,669, filed May 18, 2011 and co-pending U.S. Patent Application No. 61/490,012, filed May 25, 2011, each of which" and insert -- in U.S. Patent Publication No. 2012/0291565, which --, therefor.

Column 11
Line 43, Delete "revolution/$sec^2$," and insert -- revolutions/$sec^2$, --, therefor.

Column 16
Line 23-24, Delete "in co-pending U.S. Design application No. 29/392,223, filed May 18, 2011," and insert -- in U.S. Design Patent No. D672467, --, therefor.

Column 17
Line 11-12, Delete "U.S. Application No. 61/487,618, filed May 18, 2011," and insert -- U.S. Publication No. 2012/0293796, --, therefor.

Column 22
Line 31, Delete "5 $mm^2$" and insert -- 5 $mm^2$. --, therefor.
Line 34, Delete "6 $mm^2$" and insert -- 6 $mm^2$. --, therefor.

Column 30
Line 12, Delete "Application No. 61/487,618, filed May 18, 2011." and insert -- Publication No. 2012/0293796. --, therefor.

Signed and Sealed this
Twenty-seventh Day of October, 2015

Michelle K. Lee

Michelle K. Lee
*Director of the United States Patent and Trademark Office*

Line 67, Delete "U.S. Application No. 61/487,618, filed May 18, 2011." and insert -- U.S. Publication No. 2012/0293796. --, therefor.

Column 37
Line 29, Delete "Materials" and insert -- Materials: --, therefor.

Column 38
Line 2-3, Delete "U.S. Application No. 61/487,618, filed May 18, 2011," and insert -- U.S. Publication No. 2012/0293796, --, therefor.
Line 9-10, Delete "U.S. Application No. 61/487,618, filed May 18, 2011," and insert -- U.S. Publication No. 2012/0293796, --, therefor.
Line 65-66, Delete "U.S. Application No. 61/487,618, filed May 18, 2011," and insert -- U.S. Publication No. 2012/0293796, --, therefor.

Column 39
Line 5-6, Delete "U.S. Application No. 61/487,618, filed May 18, 2011," and insert -- U.S. Publication No. 2012/0293796, --, therefor.

In the claims

Column 40
Line 61, In Claim 11, delete "structure" and insert -- structure of --, therefor.